United States Patent
Edwards et al.

(10) Patent No.: US 12,093,914 B2
(45) Date of Patent: *Sep. 17, 2024

(54) TRANSACTION TERMINALS FOR AUTOMATED BILLING

(71) Applicant: Capital One Services, LLC, McLean, VA (US)

(72) Inventors: Joshua Edwards, Philadelphia, PA (US); Abdelkadar M'hamed Benkreira, Washington, DC (US); Michael Mossoba, Arlington, VA (US); Carrie Norman, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 23 days.

This patent is subject to a terminal disclaimer.

(21) Appl. No.: 17/647,189

(22) Filed: Jan. 6, 2022

(65) Prior Publication Data

US 2022/0129880 A1    Apr. 28, 2022

Related U.S. Application Data

(63) Continuation of application No. 16/173,546, filed on Oct. 29, 2018, now Pat. No. 11,238,427, which is a
(Continued)

(51) Int. Cl.
*G06Q 20/00* (2012.01)
*G06Q 20/10* (2012.01)
(Continued)

(52) U.S. Cl.
CPC ......... *G06Q 20/209* (2013.01); *G06Q 20/102* (2013.01); *G06Q 20/201* (2013.01); *G06Q 30/0633* (2013.01)

(58) Field of Classification Search
CPC .. G06Q 20/209; G06Q 20/102; G06Q 20/201; G06Q 30/0633; G06Q 30/04; G06Q 30/06
(Continued)

(56) References Cited

U.S. PATENT DOCUMENTS 9,773,237 B2    9/2017 Ananda et al.
10,134,022 B1 * 11/2018 Edwards ................ G06Q 30/06
(Continued)

FOREIGN PATENT DOCUMENTS

CN    107705469 A    2/2018
EP    3579164 A1    12/2019
(Continued)

OTHER PUBLICATIONS

Extended European Search Report for Application No. EP19179041.9, mailed on Oct. 31, 2019, 8 pages.
(Continued)

*Primary Examiner* — Russell S Glass
(74) *Attorney, Agent, or Firm* — Harrity & Harrity, LLP

(57) ABSTRACT

A device may receive receipt information associated with items in an order. The receipt information may include item identifiers and price descriptors associated with the items in the order. The device may receive product information associated with the items in the order. The product information may include product identifiers based on images of the items in the order and object descriptors. The device may map a first item identifier for a first item in the order and a first product identifier for determining that the first item corresponds to a first price descriptor and a first object descriptor. The device may map a second item identifier for a second item in the order and a second product identifier for determining that the second item corresponds to a second price descriptor and a second object descriptor. The device
(Continued)

may assign the first and second items to respective first and second sub-receipts.

20 Claims, 11 Drawing Sheets

Related U.S. Application Data continuation of application No. 16/002,930, filed on Jun. 7, 2018, now Pat. No. 10,134,022.

(51) Int. Cl.
*G06Q 20/20* (2012.01)
*G06Q 30/0601* (2023.01)

(58) Field of Classification Search
USPC .......................................................... 705/24
See application file for complete search history.

(56) References Cited

U.S. PATENT DOCUMENTS

| | | | |
|---|---|---|---|
| 10,699,421 B1* | 6/2020 | Cherevatsky | G06V 20/52 |
| 11,238,427 B2* | 2/2022 | Edwards | G06Q 20/102 |
| 2008/0215382 A1 | 9/2008 | Lutnick et al. | |
| 2008/0239409 A1 | 10/2008 | David | |
| 2010/0076855 A1 | 3/2010 | Karnin et al. | |
| 2011/0244919 A1* | 10/2011 | Aller | G06V 40/168 |
| | | | 382/165 |
| 2012/0143753 A1 | 6/2012 | Gonzalez et al. | |
| 2012/0208592 A1* | 8/2012 | Davis | H04N 23/635 |
| | | | 705/26.1 |
| 2012/0284132 A1 | 11/2012 | Kim et al. | |
| 2014/0129431 A1 | 5/2014 | Orttung et al. | |
| 2014/0279098 A1 | 9/2014 | Ham et al. | |
| 2016/0125383 A1 | 5/2016 | Chan et al. | |
| 2017/0249491 A1* | 8/2017 | MacIntosh | G06V 20/20 |
| 2018/0025340 A1 | 1/2018 | Schlosser et al. | |
| 2019/0102830 A1 | 4/2019 | Yin et al. | |
| 2019/0378108 A1 | 12/2019 | Edwards et al. | |
| 2020/0372228 A1* | 11/2020 | Rodriguez | G06Q 30/00 |
| 2021/0157998 A1* | 5/2021 | Rodriguez | G06V 20/20 |

FOREIGN PATENT DOCUMENTS

| | | | | |
|---|---|---|---|---|
| JP | 2014505896 A | * | 3/2014 | G06Q 30/06 |
| WO | 2018063474 A1 | | 4/2018 | |

OTHER PUBLICATIONS

Jerkins M., How Do I Split a Check With a Bad Check Splitter?, FiveThirtyEight, May 31, 2017, 8 pages.

* cited by examiner

TRANSACTION TERMINALS FOR AUTOMATED BILLING

RELATED APPLICATIONS

This application is a continuation of U.S. patent application Ser. No. 16/173,546, filed Oct. 29, 2018, which is a continuation of U.S. patent application Ser. No. 16/002,930, filed Jun. 7, 2018 (now U.S. Pat. No. 10,134,022), which are incorporated herein by reference in their entireties.

BACKGROUND

Transaction terminals, such as point of sale (POS) devices, include hardware and software components that facilitate completion of retail transactions for goods and services. Merchants may calculate an amount owed by a customer and present an itemized receipt to the customer for payment. The customer may use the POS device to make the payment to the merchant in exchange for the goods or services. After receiving payment for the goods or services, the merchant may issue a printed or electronic receipt to memorialize the completed transaction.

SUMMARY

According to some possible implementations, a method may include receiving, by a processor of a transaction terminal, receipt information associated with items included in an order. The receipt information may include item identifiers associated with the items included in the order. The item identifiers may include or be associated with price descriptors. The method may include receiving, by the processor, product information associated with the items included in the order. The product information may include product identifiers based on images of the items included in the order. The product identifiers may include or be associated with object descriptors. The method may include mapping, by the processor, a first item identifier associated with a first item included in the order and a first product identifier for determining that the first item included in the order corresponds to a first price descriptor and a first object descriptor. The method may include mapping, by the processor, a second item identifier associated with a second item included in the order and a second product identifier for determining that the second item included in the order corresponds to a second price descriptor and a second object descriptor. The method may include assigning, by the processor, the first item included in the order to a first sub-receipt of a total receipt based on determining that the first item included in the order corresponds to the first price descriptor and the first object descriptor. The method may include assigning, by the processor, the second item included in the order to a second sub-receipt of the total receipt based on determining that the second item included in the order corresponds to the second price descriptor and the second object descriptor. The method may include presenting, by the processor, the first sub-receipt for payment by a first customer, and presenting, by the processor, the second sub-receipt for payment by a second customer.

According to some possible implementations, a device may include one or more memories, and one or more processors, communicatively coupled to the one or more memories, to receive receipt information associated with items included in an order. The receipt information may include item identifiers associated with the items included in the order. The item identifiers, associated with the items included in the order, include price descriptors. The one or more processors may receive product information associated with the items included in the order. The product information may include product identifiers based on images of the items included in the order. The product identifiers may include object descriptors. The one or more processors may map a first item identifier associated with a first item included in the order and a first product identifier for determining that the first item included in the order corresponds to a first price descriptor and a first object descriptor. The one or more processors may map a second item identifier associated with a second item included in the order and a second product identifier for determining that the second item included in the order corresponds to a second price descriptor and a second object descriptor. The one or more processors may assign the first item included in the order to a first sub-receipt of a total receipt based on determining that the first item included in the order corresponds to the first price descriptor and the first object descriptor, and assign the second item included in the order to a second sub-receipt of the total receipt based on determining that the second item included in the order corresponds to the second price descriptor and the second object descriptor. The one or more processors may present the first sub-receipt for payment by a first customer, present the second sub-receipt for payment by a second customer, process a first transaction card to pay the first sub-receipt after presenting the first sub-receipt for payment, and process a second transaction card to pay the second sub-receipt after presenting the second sub-receipt for payment.

According to some possible implementations, a non-transitory computer-readable medium may store one or more instructions that, when executed by one or more processors, cause the one or more processors to receive receipt information associated with items included in an order. The receipt information may include item identifiers associated with the items included in the order. The item identifiers, associated with the items included in the order, include price descriptors. The one or more instructions, when executed by the one or more processors, may receive product information associated with the items included in the order. The product information may include product identifiers based on images of the items included in the order. The product identifiers, based on images of the items included in the order, may include object descriptors. The one or more instructions, when executed by the one or more processors, may cause the one or more processors to map a first item identifier associated with a first item included in the order and a first product identifier for determining that the first item included in the order corresponds to a first price descriptor and a first object descriptor. The one or more instructions, when executed by the one or more processors, may cause the one or more processors to map a second item identifier associated with a second item included in the order and a second product identifier for determining that the second item included in the order corresponds to a second price descriptor and a second object descriptor. The one or more instructions, when executed by the one or more processors, may cause the one or more processors to assign the first item included in the order to a first sub-receipt based on determining that the first item included in the order corresponds to the first price descriptor and the first object descriptor. The one or more instructions, when executed by the one or more processors, may cause the one or more processors to assign the second item included in the order to a second sub-receipt based on determining that the second item included in the order corresponds to the second price descriptor and the second object descriptor. The one or more instructions, when executed by the one or more processors, may cause the one or more processors to present first sub-receipt for payment by a first customer and present the second sub-receipt for payment by a second customer. The one or more instructions, when executed by the one or more processors, may cause the one or more processors to receive a request to modify the first sub-receipt. The request to modify the first sub-receipt may identify a third item included in the order to be added the first sub-receipt. The one or more instructions, when executed by the one or more processors, may cause the one or more processors to assign the third item included in the order to the first sub-receipt, to form a modified first sub-receipt, based on receiving the request to modify the first sub-receipt. The one or more instructions, when executed by the one or more processors, may cause the one or more processors to present the modified first sub-receipt for payment by the first customer.

DETAILED DESCRIPTION

Figure 1A:
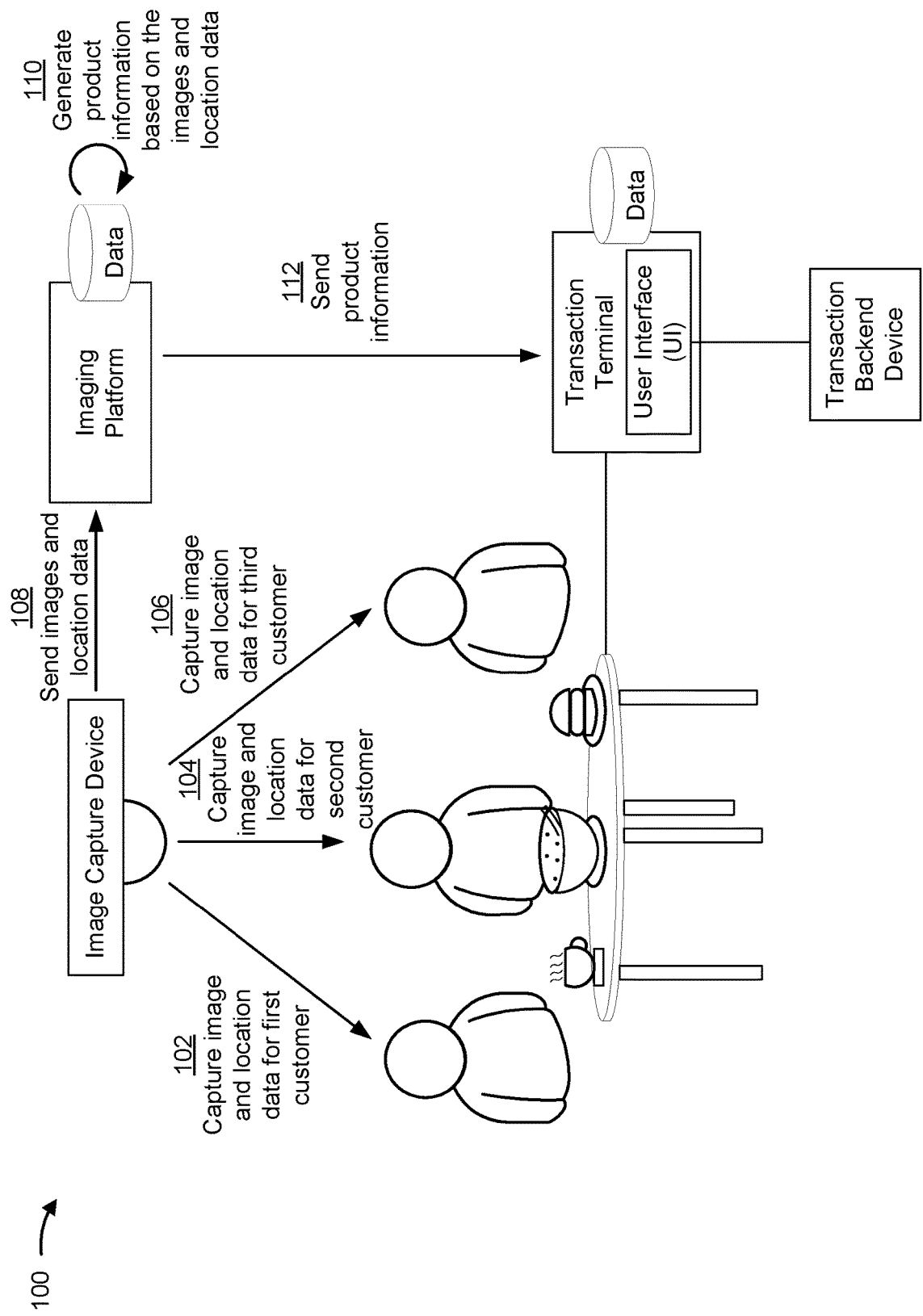
FIGS. 1A-1F are diagrams of an example implementation described herein.

The following detailed description of example implementations refers to the accompanying drawings. The same reference numbers in different drawings may identify the same or similar elements.

Transaction terminals may be used to complete payment transactions at various merchant locations. In some cases, a group of customers places an order. For example, the group of customers may sit at a table and place an order for a meal at a restaurant. A merchant employee (e.g., a server, a bartender, a cashier, etc.) may access a transaction terminal to generate and print one bill or receipt for a total payment for order of the meal at the restaurant, which may be presented to the group of customers placing the order. In some cases, the merchant employee may be asked to split the receipt among customers in the group of customers. In this case, the merchant employee must then manually split the receipt into multiple receipts based on instructions from the customers. The merchant employee may then manually interface multiple transaction cards with the transaction terminal to satisfy the total payment for the order of the meal. Manually splitting the receipt into multiple receipts and manually processing multiple transaction cards is both time and labor intensive. Moreover, relying on the merchant employee to accurately split the receipt into the multiple receipts and process the multiple transaction cards may lead to errors. For example, a customer may erroneously pay for an item that was not ordered by the customer or a wrong transaction card may be processed for a wrong amount.

Some implementations described herein provide a transaction terminal that is capable of receiving, processing, analyzing, and/or correlating receipt information and product information to automate various aspects relating to billing. For example, the transaction terminal may automate the generation and/or presentation of multiple sub-receipts from one receipt for an order placed by multiple customers, thus, automating the splitting of the one receipt. The transaction terminal may further automate payment processing to complete payment transactions for the multiple sub-receipts for the order.

In some implementations, the receipt information may include item identifiers associated with items included in the order, and the item identifiers may include price descriptors. The product information may include product identifiers based on images of the items included in the order, and the product identifiers may be associated with object descriptors (e.g., descriptors indicating the location of the items included in the order, descriptors indicating the customer placing the order, descriptors of an order identifier, etc.). Multiple sub-receipts may be generated, in some implementations, by mapping the item identifiers and the product identifiers and assigning the items included in the order to individual sub-receipts based on the object descriptors. In this way, the transaction terminal obviates the need for manually splitting of the one receipt into the multiple sub-receipts for the order. Further, the transaction terminal may automatically process payments for the multiple sub-receipts based on the object descriptors, which obviates the need for the merchant employee having to manually process multiple payments. In this way, the transaction terminal improves the efficiency at which billing occurs by virtue of automated receipt splitting, automated payment presentation, and/or automated payment processing. For example, computing resources associated with the transaction terminal that would otherwise be consumed by interacting with the merchant employee as the merchant employee manually enters data for the multiple sub-receipts may be conserved. Computing resources associated with the transaction terminal may further be conserved by virtue of conserving computing resources that would otherwise be used to fix mistakes associated with manually splitting the receipt and/or splitting the payment processing.

In some implementations, the transaction terminal includes a user interface, which facilitates automated presentation of the multiple sub-receipts while enabling modifications to be made to the multiple sub-receipts. For example, providing the transaction terminal with the user interface enables customers to customize the itemization of the multiple sub-receipts without the need for intervention by the merchant employee. Furthermore, providing the transaction terminal with the user interface obviates the need for customers having to download or utilize merchant-specific and/or transaction card association-specific payment applications for completing payment transactions, which conserves computing resources and/or reduces network traffic that would otherwise be used to download or utilize these applications.

In some implementations, the transaction terminal can further automate billing by automating procedures for responding to one or more declined payments for the order. For example, the transaction terminal may execute a set of predetermined rules or instructions that instruct the transaction terminal to process approved transaction cards associated with the order to settle a debt for a declined payment. Additionally, or alternatively, the transaction terminal may receive customer input by way of the user interface to receive instructions from one or more customers associated with the order regarding the method of settling the debt for the declined payment. For example, the transaction terminal may receive instructions from the one or more customers associated with the order to process another customer's card in the event of the declined payment. The transaction terminal herein may include a storage element that allows payment information for transaction cards associated with an order to be stored, locally, by the transaction terminal in the event of a declined payment so that the transaction terminal may automatically process the remaining approved transaction cards to settle the debt for the declined amount, in some implementations.

FIGS. 1A-1F are diagrams of an example implementation 100 described herein. As shown in FIGS. 1A-1F, example implementation 100 may include a transaction terminal with a user interface. The transaction terminal may be associated with a transaction backend device and/or an imaging platform that receives data from an image capture device.

As shown in FIG. 1A, and by reference number 102, the image capture device may capture an image (e.g., an image file, a digital image file, etc.) and location data for a first customer. In some implementations, the image and location data may be associated with one or more goods or services being ordered by or delivered to the first customer. In some implementations, the image data may be associated with the one or more goods or services being ordered by or delivered to the first customer while the location data may correspond to a location of the customer (e.g., a seat of the customer, a table setting of the customer, etc.). As an example, in this case, the image and location data may be associated with one or more food and/or beverage items being delivered to the first customer.

In some implementations, the image of the food or beverage item and/or the location data associated with the food or beverage item may be captured by the image capture device. In some implementations, the image capture device may include a camera, or any other type of data acquisition device configured to acquire and/or compute data representative of a scene in a merchant location (e.g., a location in the merchant location, a customer in the merchant location, the good or service being delivered in the merchant location, etc.), and may acquire and/or compute two-dimensional image data, three-dimensional image data, and/or light-field data. For example, the image capture device may include optics, sensors, and image processing electronics for acquiring data representative of the scene in the merchant location.

In some implementations, the location data, obtained as indicated by reference number 102, corresponds to one or more object descriptors based on the location of the image captured by the image capture device. Such object descriptors may identify various aspects relating to the image. The object descriptors may be part of an image file of an image captured by the image capture device or the image file may be tagged or otherwise associated with the object descriptors by the image capture device. For example, in some implementations, the image capture device assigns object descriptors to the image.

In some implementations, the object descriptors include location data associated with the location of the image captured by the image capture device. Other object descriptors that may be associated with the image captured by the image capture device include, for example, an order identifier associated with an order for the food or beverages ordered by a table of customers, a customer identifier associated with a customer ordering the food or beverage, timestamp information associated with the image, and/or the like. In some implementations, the object descriptors include and/or are based on spatial coordinates corresponding to a location of where the food or beverage was ordered, a location of where the food or beverage was delivered, a location of where the food or beverage was consumed, and/or the like. In some implementations, the object descriptors are based on a tag or label positioned or disposed proximate to the food or beverage item being delivered to a customer. For example, the tag or label may include a barcode, a QR barcode, a RFID tag, and/or the like, which is detected by the image capture device and associated with the image. In some cases, the tag or label may be associated with a seat, a table, tableware (e.g., a plate, bowl, glass), or a customer associated with the order for the food or beverage.

As a particular example, the image, captured with respect to reference number 102, may include an image of a cup of coffee. In this case, the image may be associated with location data in the form of object descriptors based on the location at which the coffee is delivered to the first customer. The image of the coffee may be associated with additional object descriptors in some implementations, such as, for example, an order identifier associated with an order being placed by all three customers at the table in FIG. 1A.

As further shown in FIG. 1A, and by reference number 104, the image capture device may capture an image and location data for a second customer. As described above, the location data may be in the form of one or more object descriptors that are associated with an image or image file of the captured image or may be assigned to the image file by the image capture device. In some implementations, the object descriptors are used to link the image to a location, an order, and/or a customer. As an example, the image, captured with respect to reference number 104, may include an image of a bowl of soup and the location data may be in the form of object descriptors describing a spatial location of the customer ordering the soup, the location of where the soup is ordered, the location of where the soup is delivered, the location of where the soup is consumed, and/or the like. The image may further be associated with an order identifier for the order placed by all three customers at the table and/or a customer identifier associated with the second customer, in some implementations.

As further shown in FIG. 1A, and by reference number 106, the image capture device may capture an image and location data for a third customer. As an example, the image, captured with respect to reference number 106, may include an image of a burger and the location data may be in the form of object descriptors describing a spatial location of the customer ordering the burger, the location of where the burger is ordered, the location of where the burger is delivered, the location of where the burger is consumed, and/or the like. The image may further be associated with the order identifier for the order placed by all three customers at the table and/or a customer identifier associated with the third customer, in some implementations.

As further shown in FIG. 1A, and by reference number 108, the image capture device may send the images and location data to the imaging platform. In some implementations, the image capture device may export or stream the images to the imaging platform. In some implementations, the imaging platform may request or otherwise obtain the images from the image capture device. The images may be sent from the image capture device to the imaging platform using a wired or wireless connection. For example, the image capture device may send the images and location data over a network (e.g., a cellular network, a public land mobile network (PLMN), a local area network (LAN), a wide area network (WAN), a telephone network, a private network, an ad hoc network, an intranet, the Internet, a fiber optic-based network, a cloud computing network, and/or the like). In some implementations, the images sent to the imaging platform are in the form of image files or frames from a still image or a video. The image files may include the object descriptors as described above, which may associate the images with a location, a customer, an order, and/or the like. In some implementations, images may be acquired by the imaging platform for each item ordered by a customer.

As further shown in FIG. 1A, and by reference number 110, the imaging platform may generate product information based on the images and the location data received from the image capture device. In some implementations, the imaging platform receives, as input, the images and location data and outputs the product information based on the images and location data. The product information may be in the form of product identifiers based on the images, and the product identifiers may be mapped or otherwise associated with the object descriptors.

In some implementations, the product information is obtained, in part, a result of passing the images received from the image capture device through an object recognition or image indexing technique on a computing device to obtain data (e.g., metadata) associated with the image, and passing the data obtained from the images through an imaging model stored at the imaging platform. For example, the imaging platform may train an imaging model to match incoming image data obtained from the images to product identifiers based on a machine learning algorithm, a neural network process, an artificial intelligence process, or the like. The imaging model may receive, as input, image data obtained from images captured by the image capture device and access a data structure containing the product identifiers to match the images to product identifiers. As an example, the product identifiers may identify menu items being offered for sale by a merchant restaurant and the incoming images of a customer's food or beverage may be matched to the menu items using the imaging model.

For example, the imaging platform may, using the imaging model, input data obtained from analyzing (e.g., indexing) an image of the coffee (captured at reference number 102) and output a product identifier of a "large latte" based on the image. The object descriptors for the image of the coffee identified by the product identifier "large latte" may be matched, paired, or otherwise included with the product identifier and output as the product information. Similarly, the imaging platform may, using the imaging model, input data obtained from analyzing (e.g., indexing) the image of the soup (captured at reference number 104) and output a product identifier of "crab bisque" based on the image. The object descriptors for the image of the soup identified by the product identifier "crab bisque" may be matched, paired, or otherwise included with the product identifier and output as product information. Similarly, the imaging platform may, using the imaging model, input data obtained from analyzing (e.g., indexing) the image of the burger (captured at reference number 106) and output a product identifier of a "bacon cheeseburger" based on the image. The object descriptors for the image of the burger identified by the product identifier "bacon cheeseburger" may be matched, paired, or otherwise included with the product identifier and output as product information.

In some implementations, the imaging platform may, using the imaging model, generate and output a plurality of product identifiers based on an image. For example, in some instances, the imaging platform may be unable to accurately identify a single, specific product identifier based on a captured image. In this way, the imaging model may receive, as input, image data obtained from images captured by the image capture device and access a data structure containing the product identifiers to match the images to a plurality of product identifiers. The product identifiers generated by the imaging platform, using the image model, may be based on and/or include varying degrees of confidence. For example, the imaging platform may, using the imaging model, input data obtained from analyzing (e.g., indexing) an image of the coffee (captured at reference number 102) and output product identifiers including "coffee" (e.g., at a 99% confidence level), "latte" (e.g., at a 50% confidence level), and "large" (e.g., at a 75% confidence level). The plurality of product identifiers output by the imaging platform may then be received at the transaction terminal and cross-referenced, matched, or otherwise compared with receipt information for use in generating multiple sub-receipts as described below. Similarly, the imaging platform may, using the imaging model, input data obtained from analyzing (e.g., indexing) an image of the soup (captured at reference number 104) and output product identifiers including "bowl" (e.g., at a 95% confidence level), "soup" (e.g., at a 90% confidence level), and "bisque" (e.g., at a 30% confidence level). The transaction terminal may later use the plurality of product identifiers to determine the menu items being ordered based on comparing the plurality of product identifiers and receipt information.

In some implementations, the imaging platform may, additionally, or alternatively, utilize the object descriptors when matching data obtained by analyzing the images to product identifiers. For example, in some instances the imaging platform may be unable to accurately distinguish a bacon cheeseburger from a regular cheeseburger. In this case, the imaging platform may determine, based on the object descriptors, that the bacon cheeseburger was ordered concurrently (e.g., at a same table, in a same order, proximate a same time) with coffee and soup, and may incorporate such logic into the model that matches the images, or the data obtained from the images, to product identifiers. For example, in some implementations the object descriptors link the items to an order identifier (e.g., for the entire, collective order placed by the first, second, and third customers), location, or time, which may additionally be used, by the imaging model implemented and stored by the imaging platform, when assigning the images, or the data obtained from the images, to product identifiers.

In some implementations, the imaging platform may include one or more processors and one or more digital storage media having digitally-encoded instructions embedded therein for programming the one or more processors to perform any of the methods described herein for receiving, recognizing, and/or matching images of items included in an order with product identifiers. In some implementations, the imaging platform may include a cloud server device that trains and stores the imaging model for classifying the images and/or data obtained from the images and outputting the product identifiers based on classifying the images and/or data obtained from the images.

As further shown in FIG. 1A, and by reference number 112, the imaging platform may send the product information to the transaction terminal. For example, the imaging platform may transmit, stream, export, or otherwise send the product information to the transaction terminal using wired or wireless network connections. In some implementations, the product information obtained by the transaction terminal may include the product identifiers based on the images of the items included in the order and the object descriptors based on the location of the items.

Figure 1B:
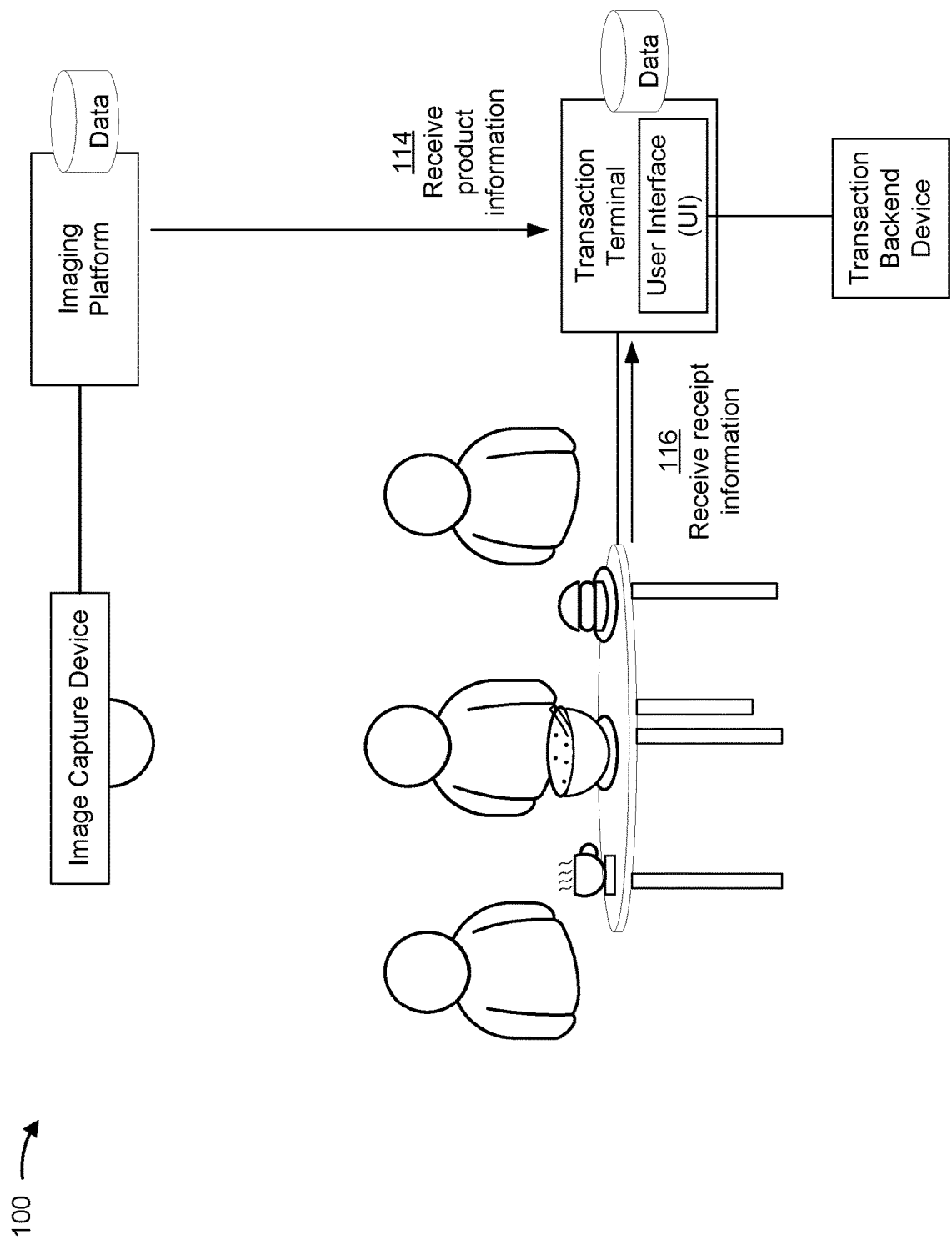

As shown in FIG. 1B, and by reference number 114, the transaction terminal may receive the product information. As an example, the transaction terminal may receive, as product information, a first product identifier for the "large latte" and the object descriptors associated with the large latte, a second product identifier for the "crab bisque" and the object descriptors associated with the crab bisque, and a third product identifier for the "bacon cheeseburger" and the object descriptors associated with the bacon cheeseburger.

As shown by reference number 116, the transaction terminal may additionally receive receipt information associated with the items included in the order by the three customers. In some implementations, the receipt information may include information regarding all the items included in the order. For example, the receipt information may include information for all the items (i.e., the coffee, the soup, and the burger) ordered by the first, second, and third customers. In some implementations, the receipt information may include item identifiers that identify the items included in the order. The item identifiers may be associated with price descriptors of the items included in the order.

As an example, the item identifier associated with the large latte may be "lg. latte" or any other suitable identifier, the item identifier for the crab bisque may be "crab bisque bowl" or any other suitable identifier, and the identifier for the bacon cheeseburger may be "cheeseburger, add bacon", or any other suitable identifier. The item identifiers for such items may further be associated with price descriptors corresponding to prices of the items identified by the item identifiers. In some implementations, the transaction terminal may receive the receipt information automatically, for example, when an order is placed, or upon the occurrence of an event or trigger. For example, a merchant employee may indicate that an order is complete, which may trigger a merchant ordering system to send the receipt information for the order to the transaction terminal.

Figure 1C:
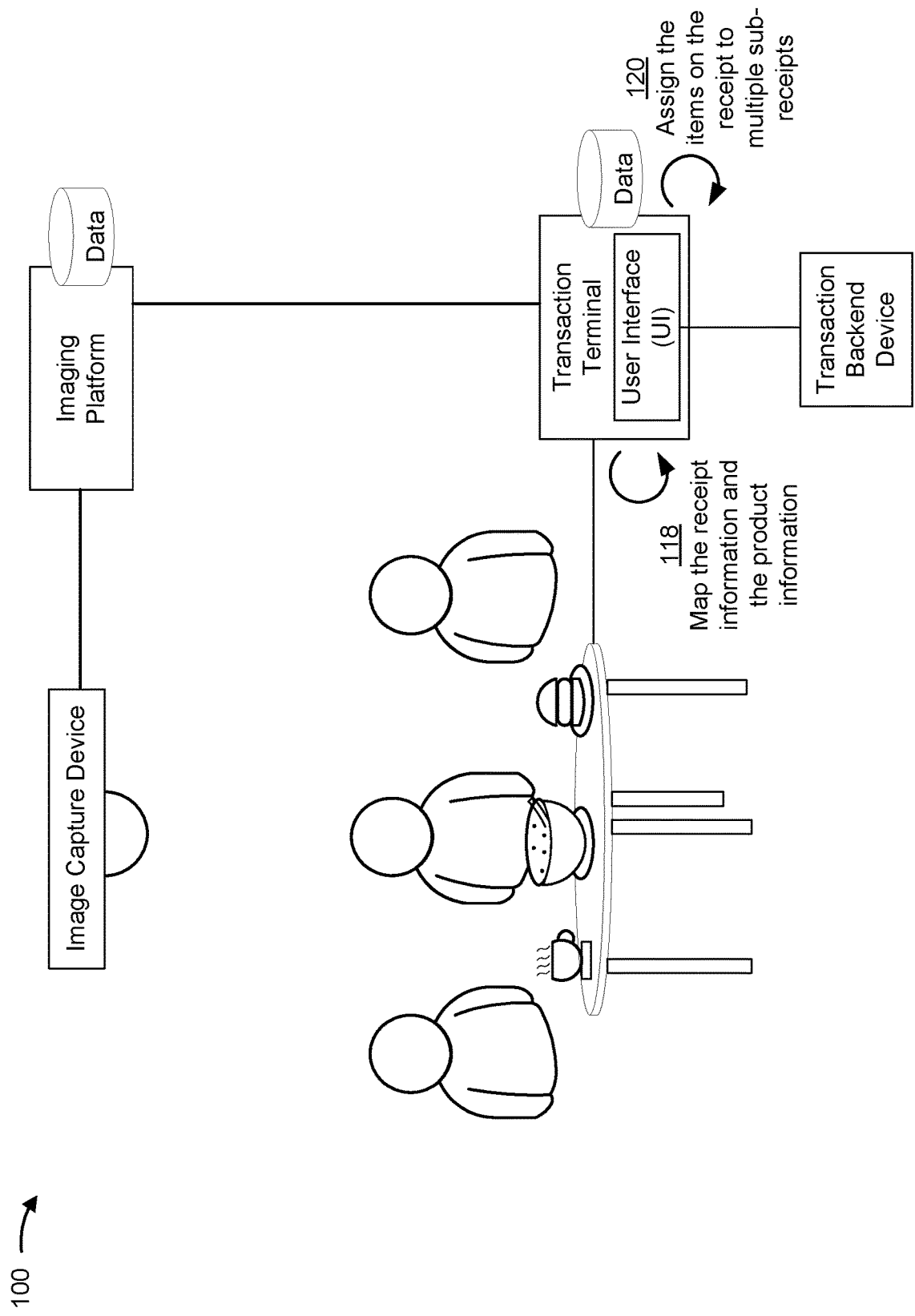

As shown in FIG. 1C, and as shown by reference number 118, the transaction terminal may map the receipt information and the product information. For example, the transaction terminal may map the item identifiers communicated in the receipt information and the product identifiers communicated in the product information. In this way, the items included on the receipt may be matched with product information based on images of the items being ordered by the customers. As an example, the item identifier "lg. latte" and the price descriptor included in the receipt information may be mapped to the product identifier "large latte" and the object descriptors included in the product information. Additionally, or alternatively, the item identifier "lg. latte" and the price descriptor included in the receipt information may be mapped to product information including the plurality of product identifiers and the object descriptors as described above. For example, where the product identifiers received by the transaction terminal include "coffee", "large", and "latte," the transaction terminal may, using logic applied by the terminal, determine that such identifiers map to the "lg. latte" on the receipt. The transaction terminal may also determine the ordering of a "small latte" by a customer based on the multiple product identifiers "coffee" and "latte" and related confidence levels associated with the product identifiers.

Similarly, the item identifier "crab bisque bowl" and the price descriptor included in the receipt information may be mapped to the product identifier "crab bisque" and the object descriptors included in the product information. Additionally, the item identifier "cheeseburger, add bacon" and the price descriptor included in the receipt information may be mapped to the product identifier "bacon cheeseburger" and the object descriptors included in the product information. In some implementations, the mapping of the receipt information and the product information may be used, by the transaction terminal, to associate the item identifiers and/or the product identifiers with the object descriptors and/or the price descriptors. In this way, the transaction terminal may automatically generate multiple sub-receipts based on the object descriptors and/or the price descriptors for the items included in an order.

As further shown in FIG. 1C, and by reference number 120, the transaction terminal may assign the items on the receipt to multiple sub-receipts based on the mapping. For example, the transaction terminal may classify or group the items included in the order according to the object descriptors (e.g., the location of where the food was ordered, delivered, consumed, etc.), automatically assign the items to a sub-receipt based on the object descriptors, and tabulate the amount owed for the sub-receipt based on the price descriptors, thus, automatically dividing one receipt into multiple sub-receipts. For example, the transaction terminal may automatically generate a first sub-receipt for the first customer ordering the coffee based on mapping the receipt information with the product information and determining that the coffee corresponds to the first customer at the first location. The transaction terminal may automatically generate a second sub-receipt for the second customer ordering the soup based on mapping the receipt information with the product information and determining that the soup corresponds to the second customer at the second location. Similarly, the transaction terminal may automatically generate a third sub-receipt for the third customer ordering the burger based on mapping the receipt information with the product information and determining that the burger corresponds to the third customer at the third location. As a result, the first sub-receipt may include the coffee and the amount owed for the coffee, the second sub-receipt may include the soup and the amount owed for the soup, and the third sub-receipt may include the burger and the amount owed for the burger. In this way, the transaction terminal obviates the need for a merchant employee to manually split the one receipt into multiple sub-receipts, thereby reducing errors associated with billing and further conserves computing resources would otherwise be associated with the merchant employee having to manually split the one receipt.

Figure 1D:
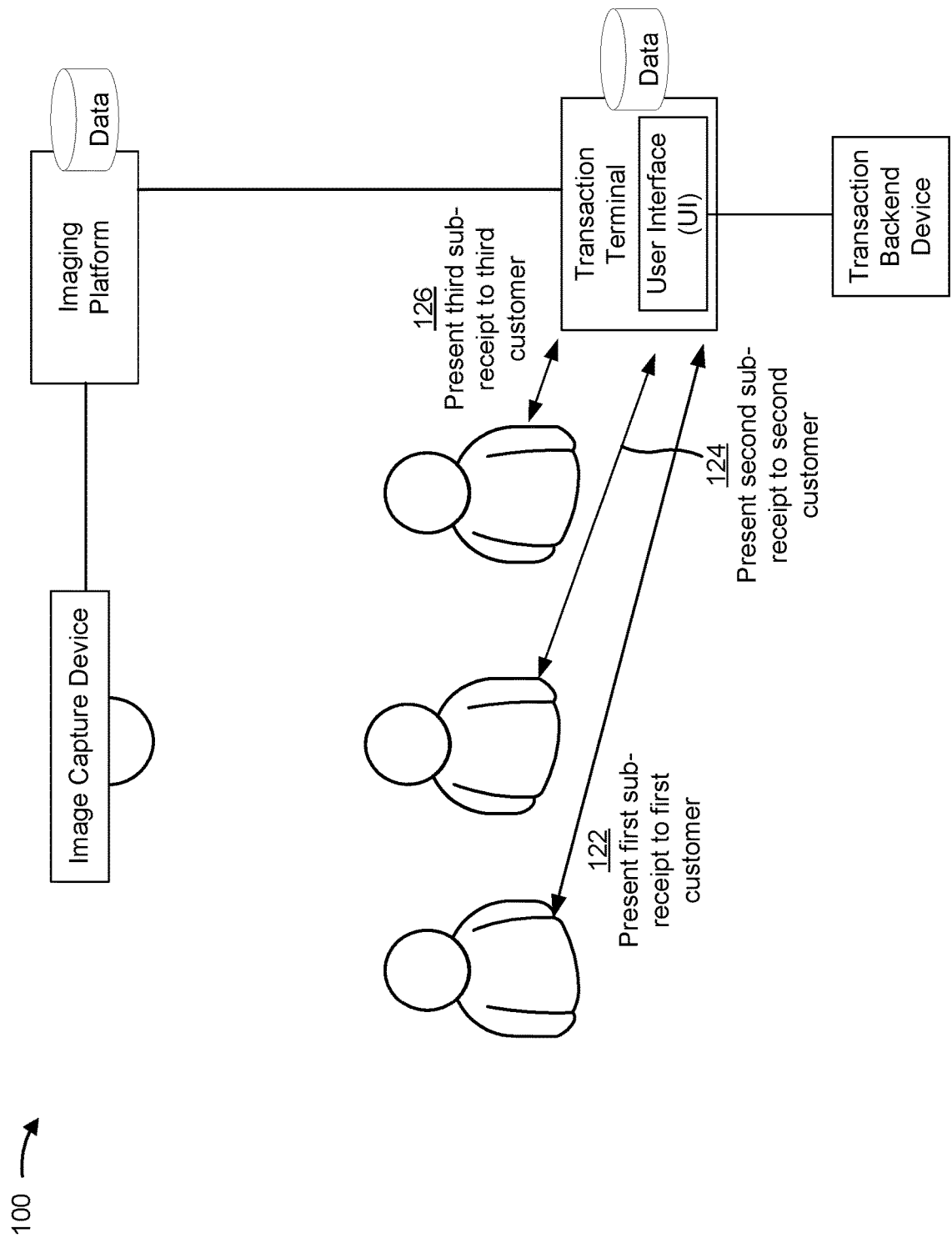

As shown in FIG. 1D, and by reference number 122, the transaction terminal may present the first sub-receipt to the first customer. In this case, continuing with the example described above, the first sub-receipt presented to the first customer may identify the coffee and the price of the coffee. In some implementations, the first sub-receipt may be presented on a printed receipt or a visual display. In some implementations, the transaction terminal may include a user interface by which the first sub-receipt is visually displayed to the first customer.

As shown by reference number 124, the transaction terminal may present the second sub-receipt to the second customer in a fashion similar to that described above. In this case, continuing with the example described above, the second sub-receipt presented to the second customer may identify the soup and the price of the soup. As shown by reference number 126, the transaction terminal may present the third sub-receipt to the third customer in a fashion similar to that described above. In this case, continuing with the example described above, the third sub-receipt presented to the third customer may identify the burger and the price of the burger. In this way, the user interface may automate presentation of the sub-receipts to the customers while also enabling modification of the sub-receipts, and further enabling payments to be completed without intervention by a merchant employee.

Figure 1E:
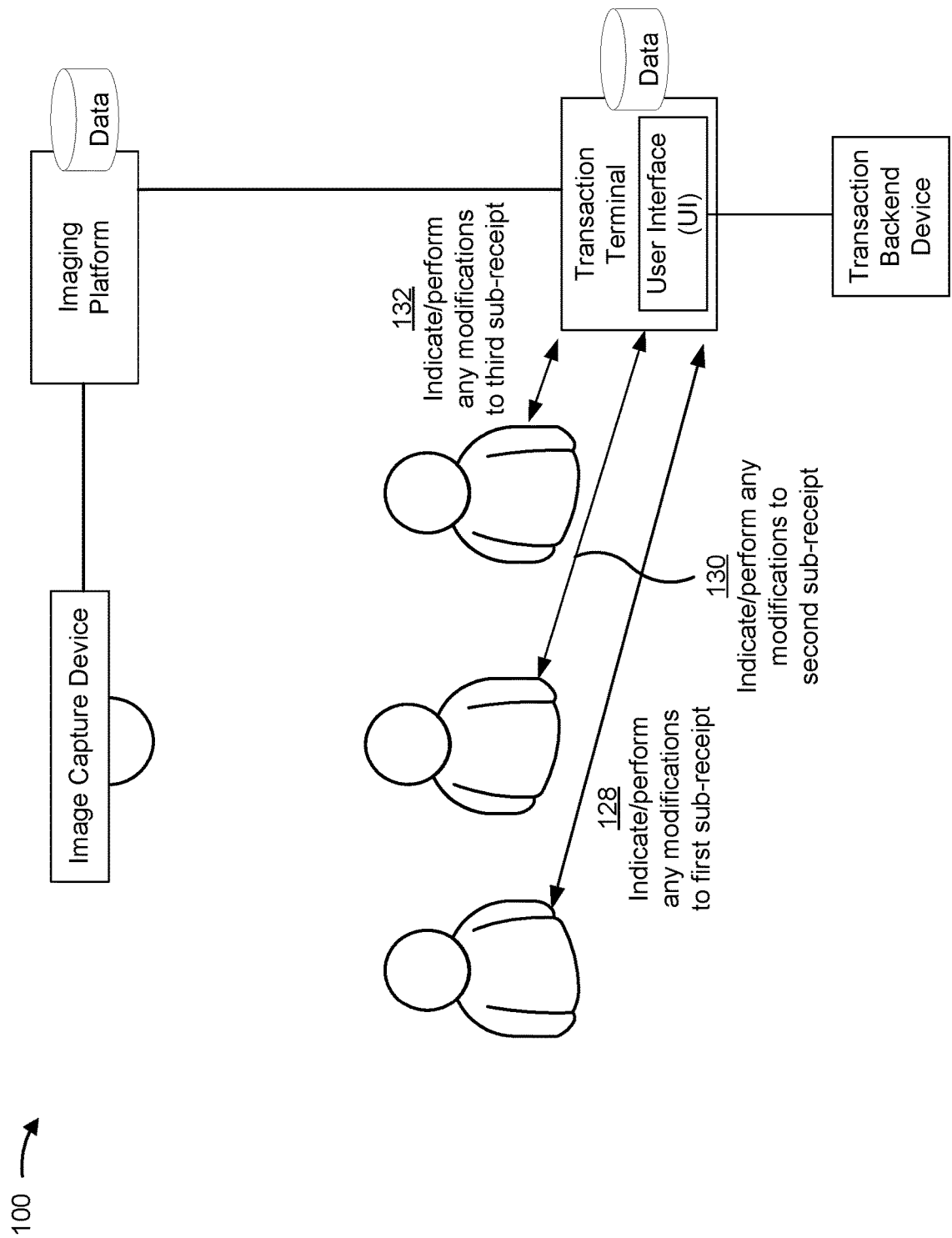

As shown in FIG. 1E, in some implementations, the transaction terminal may allow the sub-receipts to be modified. For example, modifications may include optionally merging or combining multiple sub-receipts, optionally adding or deleting items from the sub-receipts, or optionally splitting items among the sub-receipts. As shown by reference number 128, the first customer may indicate or perform modifications to the first sub-receipt. As shown by reference number 130, the second customer may indicate or perform modifications to the second sub-receipt. As shown by reference number 132, the third customer may indicate or perform modifications to the third sub-receipt.

In some implementations, the first, second, or third customer may indicate or perform modifications to the respective first, second, or third sub-receipt by way of the user interface of the transaction terminal. For example, the user interface may include a touch screen whereby the customers can drag and drop items from the receipt to their respective sub-receipt, or vice-versa. In some implementations, the user interface may include a "shared" field whereby items being dragged from the receipt to the shared field may be equally split among each of the sub-receipts for an order. For example, the user interface may employ the use of a shared field by which customers may drag and drop an appetizer that was shared, a bottle of wine that was shared, and/or the like, to be split equally among the sub-receipts. In this way, the transaction terminal enables customers to customize the itemization of sub-receipts without the need for intervention by the merchant employee. Furthermore, the user interface obviates the need for customers having to download or utilize extraneous payment applications for completing payment transactions, thereby conserving computing resources and/or reducing network traffic.

Figure 1F:
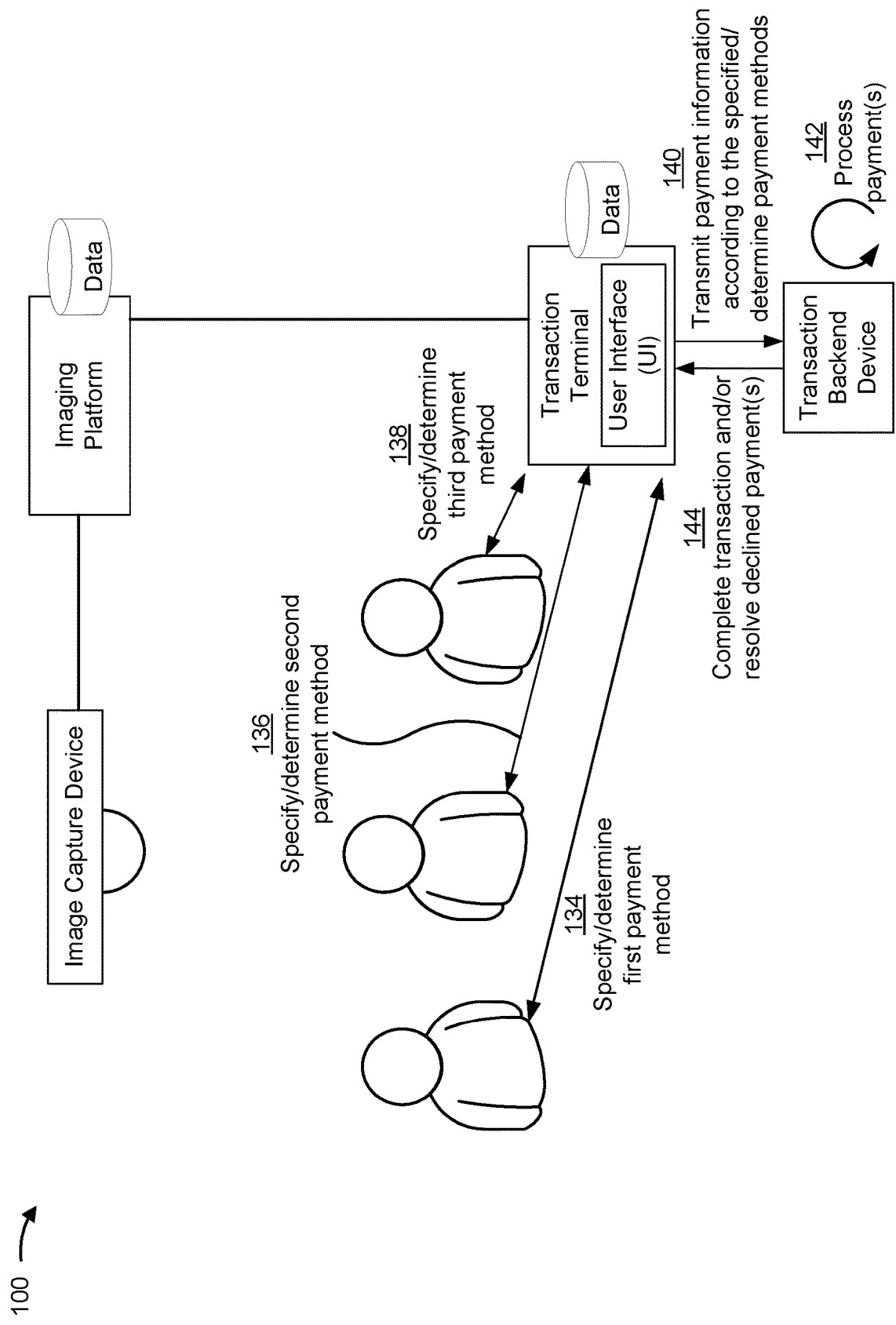

As shown in FIG. 1F, and by reference number 134, the first customer may specify a first payment method, and/or the transaction terminal may determine the first payment method. The first customer may specify a payment method, for example, by interfacing a first transaction card with the transaction terminal. Additionally, or alternatively, the transaction terminal may determine the first payment method upon automatically detecting the presence of the first transaction card at a first location that matches one or more of the object descriptors associated with the image of the coffee ordered by the first customer. In some implementations, the transaction terminal may automatically read transaction information (e.g., a transaction card number, expiration date, etc.) from the first transaction card using near-field communication (NFC), a Bluetooth Low Energy signal (e.g., iBeacon), an image of the card, from a wallet or virtual card implemented on a user device (e.g., a phone, a computer, a wearable computer such as a watch or eyeglasses, etc.) and/or the like.

In some implementations, the transaction terminal may be configured to automatically divide a total amount owed for the order equally among the first, second, and third customer transaction cards. For example, where a receipt is to be split equally among multiple customers, the customers may interface their respective payment cards with the transaction terminal, and the transaction terminal may process the cards by dividing the total amount owed equally among the number of cards being interfaced with the transaction terminal. In some implementations, the transaction terminal may include a timing mechanism whereby if, after a predetermined amount of time, the transaction terminal does not receive information for a further transaction card, the transaction terminal may determine that the payment process is complete, and the transaction terminal may process each card interfaced with the transaction terminal for an equal amount, or a substantially equal amount (e.g., +/− one-cent, etc.).

In some implementations, the transaction card(s) being used to pay for the order as described herein may include a credit card, a debit card, a gift card, a payment card, an automated teller machine (ATM) card, a stored-value card, a fleet card, a transit card, an access card, a virtual card implemented on a user device (e.g., a phone, a computer, a wearable computer such as a watch or eyeglasses, and/or the like). In some implementations, the transaction card may be capable of storing and/or communicating data for a point-of-sale (PoS) transaction with the transaction terminal. For example, the transaction card may store and/or communicate data, including account information (e.g., an account identifier, a cardholder identifier, etc.), expiration information of the transaction card (e.g., information identifying an expiration month and/or year of the transaction card), banking information (e.g., a routing number of a bank, a bank identifier, etc.), transaction information (e.g., a payment token), and/or the like. For example, to store and/or communicate the data, the transaction card may include a magnetic strip and/or an integrated circuit (IC) chip (e.g., a EUROPAY®, MASTERCARD®, VISA® (EMV) chip).

In some implementations, the transaction card may include an antenna to communicate data associated with the transaction card. The antenna may be a passive radio frequency (RF) antenna, an active RF antenna, and/or a battery-assisted RF antenna. In some implementations, the transaction card may be a smart transaction card, capable of communicating wirelessly (e.g., via Bluetooth, Bluetooth Low Energy (BLE), near-field communication (NFC), and/or the like) with a computing device, such as the user device, a digital wallet, and/or another device. In some implementations, the transaction card may communicate with the transaction terminal to complete a transaction (e.g., based on being moved within communicative proximity of the transaction terminal), as described herein.

As further shown in FIG. 1F, and by reference number 136, the second payment method may be specified or determined by the second customer in a fashion similar to that described above with respect to the first payment method specified by the first customer. For example, in some implementations, the second customer may specify the payment method via interfacing a second transaction card with the transaction terminal. The transaction terminal may process the second transaction card for an amount on the second sub-receipt or determine to divide the total amount owed for the order equally among all customers. The transaction terminal may, in some instances, detect the presence of the second transaction card at the second location, which corresponds to the object descriptors of the soup, and automatically process the transaction card for the amount owed for the image of the soup.

As further shown in FIG. 1F, and by reference number 138, the third payment method may be specified or determined by the third customer in a fashion similar to that described above with respect to the first payment method specified by the first customer and/or the second payment method specified by the second customer. In some implementations, the third customer may specify the payment method for the third sub-receipt by interfacing a third transaction card with the transaction terminal. In some implementations, the transaction terminal may automatically split the total amount owed for the order equally among the customers. In some implementations, the transaction terminal may detect the presence of the third card at the third location matching the object descriptors for the image of the burger.

As further shown in FIG. 1F, and by reference number 140, the transaction terminal may transmit the payment information to one or more transaction backend devices according to the specified or determined payment methods. For example, the transaction terminal may transmit payment information for the first, second, and third transaction cards used to settle each of the respective first, second, and third sub-receipts. In some implementations, the transaction terminal may automatically split the total amount owed for the order equally among the first, the second, and the third transaction cards.

As further shown in FIG. 1F, and by reference number 142, the transaction backend device may process the payments. For example, the transaction backend device may be associated with a financial institution with which the merchant has an account and may communicate with devices associated with a financial institution with which each of the customers have an account to determine whether the payment is approved. In this case, the transaction backend device may authorize a payment by a customer if the transaction backend device determines the payment by the customer should be approved and may decline the transaction if the transaction backend device determines the payment should not be approved. In some implementations, the transaction backend device may receive information associated with the first, second, and third transaction cards used to settle the total amount owed for the receipt and/or amounts owed for the respective sub-receipts.

As further shown in FIG. 1F, and by reference number 144, the transaction terminal may complete the transaction(s) and/or resolve declined payment(s). To complete the transaction, the transaction terminal may issue a printed receipt, display a receipt, or transmit an electronic receipt to memorialize each of the authorized and completed payment transactions. Where a payment by one or more of the transaction cards is declined, the transaction terminal may prompt one or more of the customers to receive a replacement transaction card to settle the debt for the declined amount. The one or more customers may be prompted by the user interface of the transaction terminal.

In some implementations, the transaction terminal may automatically process the remaining cards (i.e., that were authorized for payment) to settle the debt for the declined amount. For example, the transaction cards that were authorized for payment may be equally charged for an amount equal to the declined amount. In some implementations, the transaction terminal may access rules for determining how to resolve declined payments. For example, the rules may instruct the transaction terminal to prompt the one or more customers for the additional payment. As another example, the rules may instruct the transaction terminal to automatically charge one or more of the authorized transaction cards for the declined amount. In this way, the transaction terminal can further automate the procedures and/or processes for responding to one or more declined payments for an order that includes multiple payments. In some implementations, the transaction terminal includes a storage or memory device by which the transaction terminal may temporarily store payment information (e.g., via caching, hashing, etc.) for an order until the order has been paid in full. In some implementations, the stored payment information is used to pay for any amount owed due to a declined payment.

In this way, the transaction terminals described herein automate various aspects related to billing and improve the efficiency at which the payment transactions are processed and/or completed by virtue of automating receipt splitting, payment presentation, and/or payment processing. The transaction terminals described herein may obviate the need to manually split one receipt into multiple sub-receipts, thereby reducing errors associated with processing and/or completing payment transactions. Furthermore, providing the transaction terminal with a user interface facilitates automated sub-receipt presentation while enabling modification of the sub-receipts and/or payments to be completed without intervention by a merchant employee (e.g., a server, bartender, cashier, etc.).

As indicated above, FIGS. 1A-1F are provided merely as an example. Other examples are possible and may differ from what was described with regard to FIGS. 1A-1F. Although the example implementation relates to a restaurant setting and automating billing for menu items, other implementations may include non-restaurant settings and non-menu items. Other example implementations may include, for example, automated billing for a retail store selling goods, a business selling services (e.g., spa services, and/or the like), a business dealing in residential or commercial rentals, a hotel, an airline, and/or the like.

Figure 2:
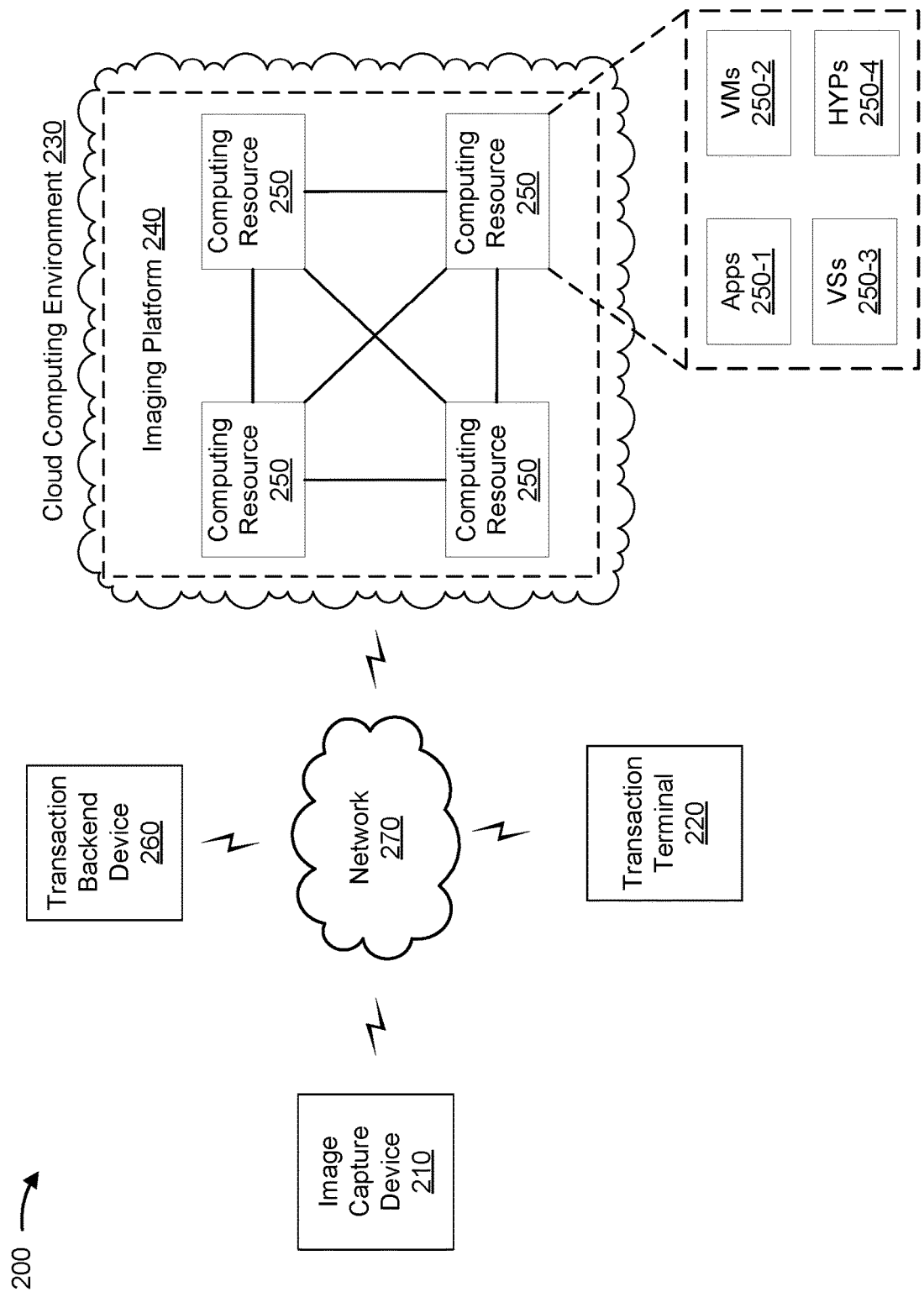
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an image capture device 210, a transaction terminal 220, a cloud computing environment 230, an imaging platform 240, a computing resource 250, a transaction backend device 260, and a network 270. Devices of environment 200 may interconnect via wired connections, wireless connections, or a combination of wired and wireless connections.

Image capture device 210 includes one or more devices capable of capturing an image associated with a merchant location, such as an image associated with one or more goods or services provided by the merchant to a customer at the merchant location. As an example, image capture device 210 may capture images of food offered at the merchant location. The images captured by image capture device 210 may include digital files identified by one or more object descriptors pertaining to a location of where the image was captured or a day/time that the image was captured. Image capture device 210 may include a digital still camera (DSC), a video camera, a computer equipped with an internal or external camera, a device (e.g., a cell phone, a clock, a television, etc.) equipped with an image capturing mechanism, a combination thereof, and/or the like. Image capture device 210 may include optics, image sensors (e.g., CCD, CMOS, etc.), network connection components, and/or image labeling components (e.g., for assigning object descriptors to images).

Transaction terminal 220 includes one or more devices capable of receiving, collecting, obtaining, gathering, storing, correlating, mapping, processing, and/or facilitating the splitting of one receipt into multiple sub-receipts and processing one or more transaction cards for payment of the multiple sub-receipts. In some implementations, transaction terminal 220 includes a transaction terminal device that facilitates the automatic division of one receipt for an order into multiple sub-receipts, facilitates the presentation of the multiple sub-receipts to multiple customers, facilitates the acceptance of modifications (e.g., adding items to one or more of the multiple sub-receipts, merging one or more of the multiple sub-receipts, splitting item(s) among the multiple sub-receipts, etc.) to one or more of the multiple sub-receipts, and facilitates the processing of a transaction using one or more transaction cards. Transaction terminal 220 may include a PoS terminal, a payment terminal (e.g., a credit card terminal, a contactless payment terminal, a mobile credit card reader, a chip reader, etc.), a security access terminal, an automated teller machine (ATM) terminal, and/or the like. In some implementations, transaction terminal 220 may communicate with transaction backend device 260 to provide, to transaction backend device 260, information related to a transaction for which the transaction card is being used, as described elsewhere herein. In some implementations, transaction terminal 220 may communicate with imaging platform 240 for receiving product data and correlating the product data to receipt information.

In some implementations, transaction terminal 220 may include one or more input components and/or output components to facilitate the splitting of the one receipt into the multiple sub-receipts, presenting the multiple sub-receipts, modifying the multiple sub-receipts, and/or obtaining information from one or more transaction cards (e.g., an account number of an account associated with the transaction card, an expiration date of the transaction card, etc.), input (e.g., a PIN, a signature, biometric information, etc.), from one or more cardholders of the transaction card, related to completing and/or authorizing a transaction, and/or the like. In some implementations, example input components of transaction terminal 220 may include a number keypad, a touch screen, a user interface, a magnetic strip reader, a chip reader, a pen and corresponding signature pad, a radio frequency (RF) signal reader, and/or the like.

In some implementations, a magnetic strip reader of transaction terminal 220 may receive data from the transaction card as a magnetic strip of the transaction card is swiped along the magnetic strip reader. In some implementations, a chip reader of transaction terminal 220 may receive data from the transaction card via an integrated circuit chip (e.g., an EMV chip) of the transaction card when the chip is placed within communicative proximity of the chip reader. In some implementations, an RF signal reader of transaction terminal 220 may enable a contactless transaction from the transaction card and/or customer device containing a virtual card stored therein by obtaining data wirelessly from the transaction card and/or the customer device as the transaction card and/or the customer device comes within communicative proximity of transaction terminal 220, such that the RF signal reader detects an RF signal from an RF antenna of the transaction card and/or the customer device.

In some implementations, example output components of transaction terminal 220 may include a display, a speaker, a printer, a light, and/or the like. In some implementations, transaction terminal 220 may use an output component to output information related to a transaction (e.g., an indication to cause a customer to input information to authorize a transaction, information that identifies whether a transaction was completed, etc.). In some implementations, transaction terminal 220 may include a user interface that allows customer(s) to modify sub-receipts and/or modify payments. In some implementations, transaction terminal 220 may include a memory to store payment information in the event of a declined payment.

In some implementations, transaction terminal 220 may automatically detect and/or process transaction cards by reading numbers of transaction cards presented at locations that corresponding to object descriptors (e.g., location descriptors) based on images of the items ordered at the locations as described herein. In some implementations, transaction terminal 220 may automatically split and/or process transactions associated with transaction cards by automatically detecting the number of transaction cards interfaced with transaction terminal 220 during a specified time period and splitting the payments equally among the transaction cards.

Cloud computing environment 230 includes an environment that delivers computing as a service, whereby shared resources, services, etc. may be provided to transaction terminal 220. Cloud computing environment 230 may provide computation, software, data access, storage, and/or other services that do not require end-user knowledge of a physical location and configuration of a system and/or a device that delivers the services. As shown, cloud computing environment 230 may include imaging platform 240 and computing resource 250. In some implementations, cloud computing environment 230 includes an environment that hosts imaging platform 240.

Imaging platform 240 may include may include one or more devices capable of receiving, determining, processing, storing, and/or providing information associated with images from image capture device 210. For example, in some implementations, imaging platform 240 receives images from image capture device 210, receives object descriptors associated with the images received from image capture device 210, correlates the received images and object descriptors to data for goods or services offered by the merchant location (e.g., correlate the images to specific menu items, to specific goods, etc.), and generates product information based on correlating the received images and object descriptors to data for the goods or services offered by the merchant location. As an example, in some implementations, imaging platform 240 may be configured to receive or acquire images in a raw or processed format from image capture device 210 and associate the images to product identifiers that are associated with menu items as described herein.

In some implementations, imaging platform 240 may include a server or a group of servers. In some implementations, imaging platform 240 may generate, train, update, store, and/or provide a model for identifying goods or services offered by merchants based on images of the goods or services. In some implementations, imaging platform 240 accesses a data structure including specified menu, catalog, or product items offered by merchants and assigns the images to product information associated with the specified menu, catalog, or product items for use by transaction terminal 220 in mapping receipt information to the product information.

In some implementations, as shown, imaging platform 240 may be hosted in cloud computing environment 230. Notably, while implementations described herein describe imaging platform 240 as being hosted in cloud computing environment 230, in some implementations, imaging platform 240 may not be cloud-based or may be partially cloud-based.

Computing resource 250 includes one or more personal computers, workstation computers, server devices, or another type of computation and/or communication device. In some implementations, computing resource 250 may host imaging platform 240. The cloud resources may include compute instances executing in computing resource 250, storage devices provided in computing resource 250, data transfer devices provided by computing resource 250, etc. In some implementations, computing resource 250 may communicate with other computing resources 250 via wired connections, wireless connections, or a combination of wired and wireless connections.

As further shown in FIG. 2, computing resource 250 may include a group of cloud resources, such as one or more applications ("APPs") 250-1, one or more virtual machines ("VMs") 250-2, virtualized storage ("VSs") 250-3, one or more hypervisors ("HYPs") 250-4, or the like.

Application 250-1 includes one or more software applications that may be provided to or accessed by image capture device 210. Application 250-1 may eliminate a need to install and execute the software applications on image capture device 210. For example, application 250-1 may include software associated with imaging platform 240 and/or any other software capable of being provided via cloud computing environment 230. In some implementations, one application 250-1 may send/receive information to/from one or more other applications 250-1, via virtual machine 250-2.

Virtual machine 250-2 includes a software implementation of a machine (e.g., a computer) that executes programs like a physical machine. Virtual machine 250-2 may be either a system virtual machine or a process virtual machine, depending upon use and degree of correspondence to any real machine by virtual machine 250-2. A system virtual machine may provide a complete system platform that supports execution of a complete operating system ("OS"). A process virtual machine may execute a single program and may support a single process. In some implementations, virtual machine 250-2 may execute on behalf of a user (e.g., image capture device 210), and may manage infrastructure of cloud computing environment 230, such as data management, synchronization, or long-duration data transfers.

Virtualized storage 250-3 includes one or more storage systems and/or one or more devices that use virtualization techniques within the storage systems or devices of computing resource 250. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 250-4 provides hardware virtualization techniques that allow multiple operating systems (e.g., "guest operating systems") to execute concurrently on a host computer, such as computing resource 250. Hypervisor 250-4 may present a virtual operating platform to the guest operating systems, and may manage the execution of the guest operating systems. Multiple instances of a variety of operating systems may share virtualized hardware resources.

Transaction backend device 260 includes one or more devices capable of authorizing and/or facilitating a transaction. For example, transaction backend device 260 may include one or more servers and/or computers to store and/or provide information associated with processing a transaction via transaction terminal 220. In some implementations, transaction backend device 260 processes information communicated by transaction terminal 220 to authorize, decline, and/or complete a transaction, as described herein.

Transaction backend device 260 includes one or more devices associated with a financial institution (e.g., a bank, a lender, a credit union, a credit card institution, etc.) that authorizes a transaction based on information communicated by transaction terminal 220. For example, transaction backend device 260 may include one or more devices of one or more issuing banks associated with a cardholder of the transaction card, one or more devices of one or more acquiring banks (or merchant banks) associated with transaction terminal 220, and/or one or more devices associated with one or more transaction card associations (e.g., VISA®, MASTERCARD®, and/or the like) associated with the transaction card interfaced with transaction terminal 220. Accordingly, based on receiving information associated with the transaction card from transaction terminal 220, devices of transaction backend device 260 (e.g., associated with a financial institution or transaction card association) may communicate to authorize a transaction associated with the transaction card and/or transaction terminal 220. In some implementations, the financial institution or transaction card may communicate with transaction terminal 220 to decline a request. Transaction terminal 220 may respond to the declined request according to executing predetermined instructions and/or customer instructions.

In some implementations, transaction backend device 260 may provide or deny authorization associated with a transaction. For example, transaction backend device 260 may store and/or provide information that may allow, or deny, access through an access point (e.g., a gate, a door, and/or the like) of a secure location (e.g., a room, a building, a geographical area, a transportation terminal, and/or the like) based on information (e.g., account information, a key, an identifier, credentials, and/or the like) associated with the transaction card and/or provided by transaction terminal 220.

In some implementations, transaction backend device 260 may include one or more devices associated with a rewards program associated with the transaction card and/or an entity (e.g., a financial institution, a merchant, a service provider, a vendor, and/or the like) associated with the transaction card and/or transaction terminal 220. For example, transaction backend device 260 may authorize the earning and/or redemption of rewards (e.g., rewards points associated with the transaction card, cash rewards, client loyalty rewards associated with an entity associated with transaction terminal 220, and/or the like) based on a transaction processed by transaction terminal 220.

In some implementations, transaction backend device 260 may be hosted in cloud computing environment 230. In some implementations, transaction backend device 260 may not be cloud-based (i.e., may be implemented outside of a cloud computing environment) or may be partially cloud-based.

Network 270 includes one or more wired and/or wireless networks. For example, network 270 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
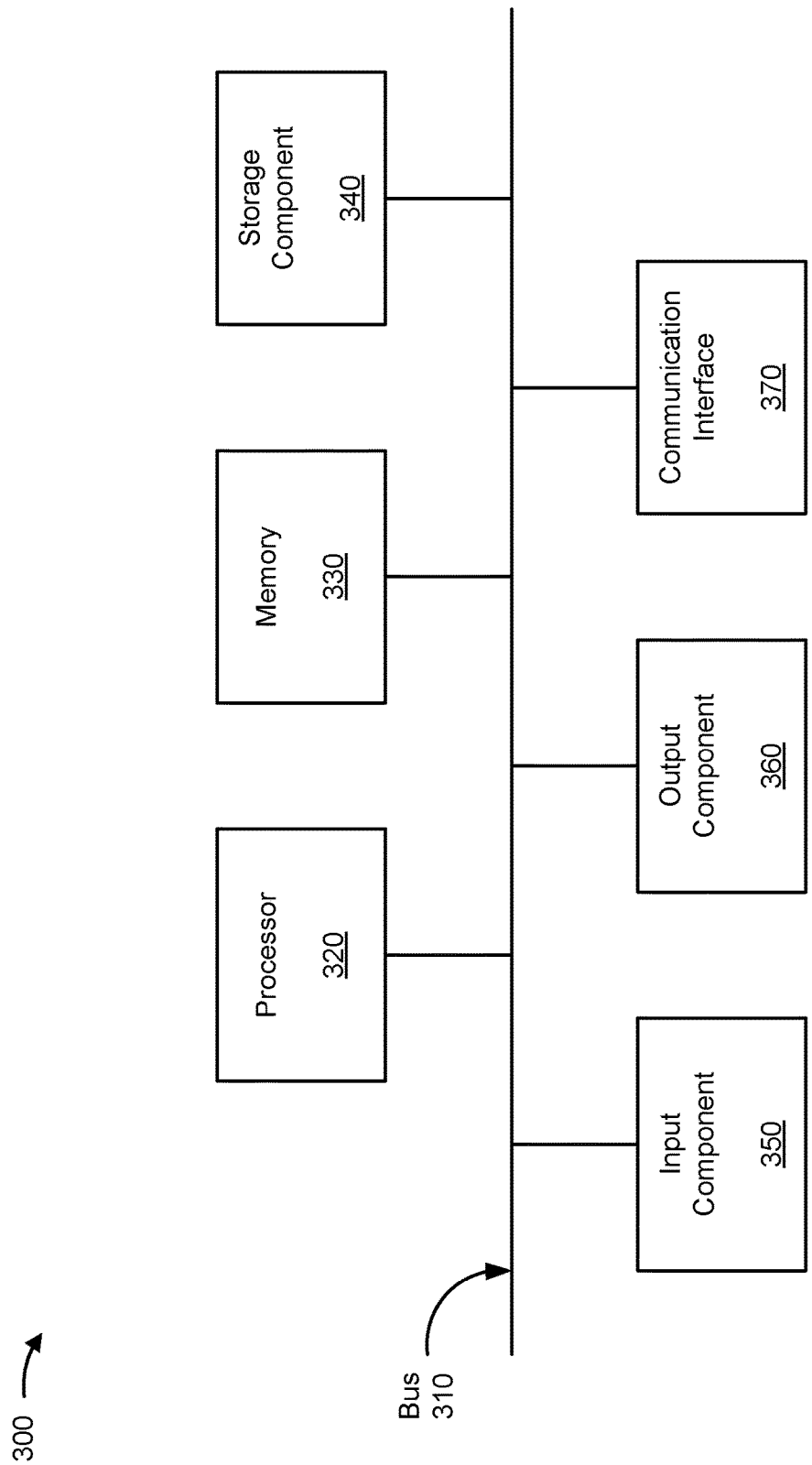
FIG. 3 is a diagram of example components of one or more devices of FIG. 2.

FIG. 3 is a diagram of example components of a device 300. Device 300 may correspond to image capture device 210, transaction terminal 220, imaging platform 240, computing resource 250, and/or transaction backend device 260. In some implementations, image capture device 210, transaction terminal 220, imaging platform 240, computing resource 250, and/or transaction backend device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, a printer, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
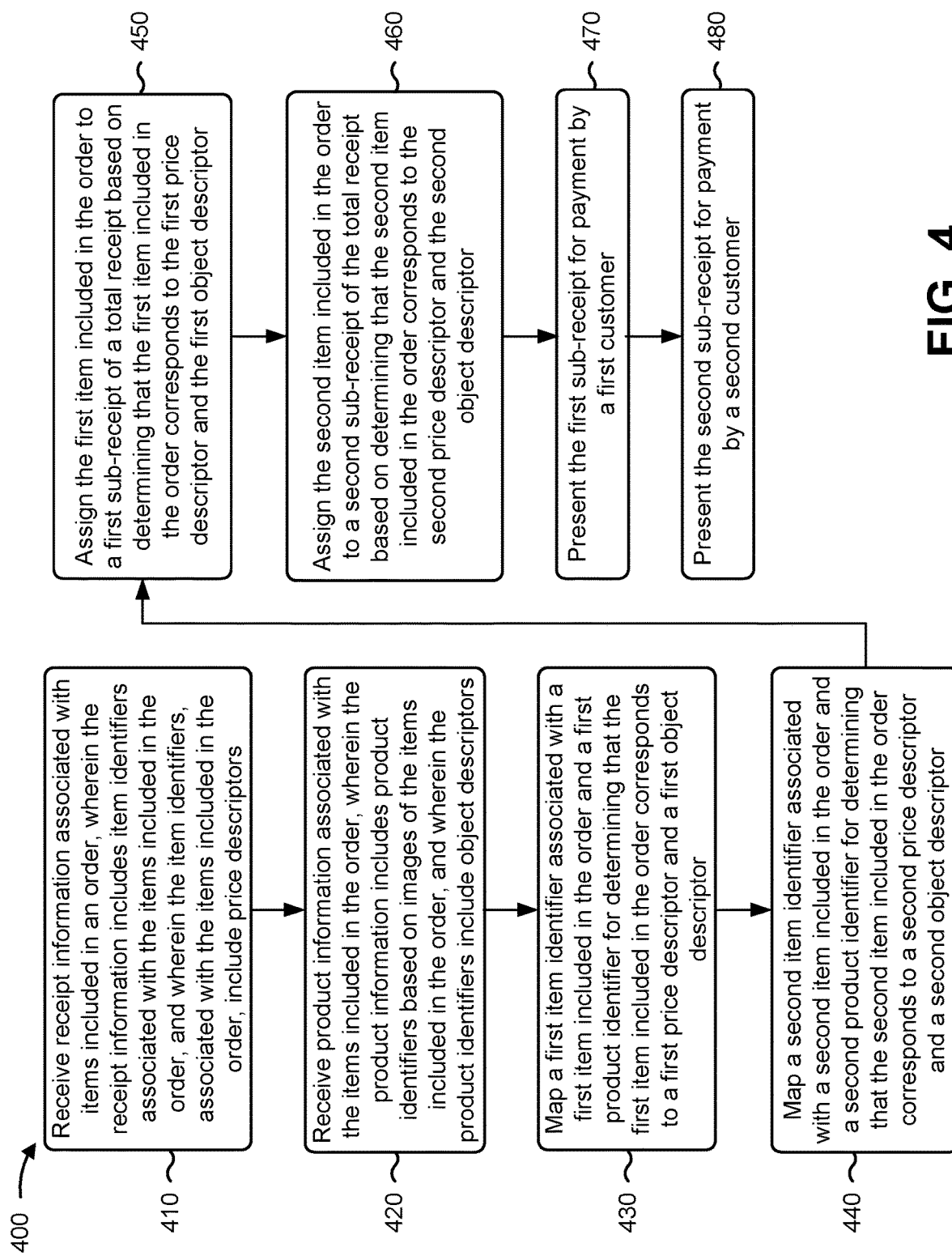
FIG. 4 is a flow chart of an example process for automated billing.

FIG. 4 is a flow chart of an example process for automated billing. In some implementations, one or more process blocks of FIG. 4 may be performed by a transaction terminal (e.g., transaction terminal 220). In some implementations, one or more process blocks of FIG. 4 may be performed by another device or a group of devices separate from or including the transaction terminal, such as an image capture device (e.g., image capture device 210), an imaging platform (e.g., imaging platform 240), or a transaction backend device (e.g., transaction backend device 260).

As shown in FIG. 4, process 400 may include receiving receipt information associated with items included in an order, wherein the receipt information includes item identifiers associated with the items included in the order, and wherein the item identifiers, associated with the items included in the order, include price descriptors (block 410). For example, the transaction terminal (e.g., transaction terminal 220, using processor 320, memory 330, storage component 340, input component 350, communication interface 370, and/or the like) may receive receipt information associated with items included in an order, as described above in connection with FIGS. 1A-1F. In some implementations, the receipt information may include item identifiers associated with the items included in the order. In some implementations, the item identifiers, associated with the items included in the order, may include price descriptors.

As further shown in FIG. 4, process 400 may include receiving product information associated with the items included in the order, wherein the product information includes product identifiers based on images of the items included in the order, and wherein the product identifiers include object descriptors (block 420). For example, the transaction terminal (e.g., transaction terminal 220, using processor 320, memory 330, storage component 340, input component 350, communication interface 370, and/or the like) may receive product information associated with items included in an order, as described above in connection with FIGS. 1A-1F. In some implementations, the product information may include product identifiers based on images of the items included in the order. In some implementations, the product identifiers may include object descriptors.

As further shown in FIG. 4, process 400 may include mapping a first item identifier associated with a first item included in the order and a first product identifier for determining that the first item included in the order corresponds to a first price descriptor and a first object descriptor (block 430). For example, the transaction terminal (e.g., transaction terminal 220, using processor 320, memory 330, storage component 340, communication interface 370, and/or the like) may map a first item identifier associated with a first item included in the order and a first product identifier for determining that the first item included in the order corresponds to a first price descriptor and a first object descriptor, as described above in connection with FIGS. 1A-1F.

As further shown in FIG. 4, process 400 may include mapping a second item identifier associated with a second item included in the order and a second product identifier for determining that the second item included in the order corresponds to a second price descriptor and a second object descriptor (block 440). For example, the transaction terminal (e.g., transaction terminal 220, using processor 320, memory 330, storage component 340, communication interface 370, and/or the like) may map a second item identifier associated with a second item included in the order and a second product identifier for determining that the second item included in the order corresponds to a second price descriptor and a second object descriptor, as described above in connection with FIGS. 1A-1F.

As further shown in FIG. 4, process 400 may include assigning the first item included in the order to a first sub-receipt of a total receipt based on determining that the first item included in the order corresponds to the first price descriptor and the first object descriptor (block 450). For example, the transaction terminal (e.g., transaction terminal 220, using processor 320, memory 330, storage component 340, communication interface 370, and/or the like) may assign the first item included in the order to a first sub-receipt of a total receipt based on determining that the first item included in the order corresponds to the first price descriptor and the first object descriptor, as described above in connection with FIGS. 1A-1F.

As further shown in FIG. 4, process 400 may include assigning the second item included in the order to a second sub-receipt of the total receipt based on determining that the second item included in the order corresponds to the second price descriptor and the second object descriptor (block 460). For example, the transaction terminal (e.g., transaction terminal 220, using processor 320, memory 330, storage component 340, communication interface 370, and/or the like) may assign the second item included in the order to a second sub-receipt of the total receipt based on determining that the second item included in the order corresponds to the second price descriptor and the second object descriptor, as described above in connection with FIGS. 1A-1F.

As further shown in FIG. 4, process 400 may include presenting the first sub-receipt for payment by a first customer (block 470). For example, the transaction terminal (e.g., transaction terminal 220, using processor 320, memory 330, storage component 340, output component 360, communication interface 370, and/or the like) may present the first sub-receipt for payment by a first customer, as described above in connection with FIGS. 1A-1F.

As further shown in FIG. 4, process 400 may include presenting the second sub-receipt for payment by a second customer (block 480). For example, the transaction terminal (e.g., transaction terminal 220, using processor 320, memory 330, storage component 340, output component 360, communication interface 370, and/or the like) may present the second sub-receipt for payment by a second customer, as described above in connection with FIGS. 1A-1F.

Process 400 may include additional implementations, such as any single implementation or any combination of implementations described below and/or in connection with the one or more processes described elsewhere herein.

In some implementations, the object descriptors may include spatial descriptors that are based on one of first locations corresponding to where the items included in the order were ordered, second locations corresponding to where the items included in the order were delivered, or third locations corresponding to where the items included in the order were consumed. In some implementations, the object descriptors may be based on a location of a seat, a customer, a table, or tableware.

In some implementations, process 400 may further include receiving a first request to pay the first sub-receipt, processing a first transaction card to pay the first sub-receipt after receiving the first request, receiving a second request to pay the second sub-receipt, and processing a second transaction card to pay the second sub-receipt after receiving the second request.

In some implementations, process 400 may further include receiving a request to combine the first sub-receipt with the second sub-receipt to form the total receipt, receiving a request to pay the total receipt, and processing a plurality of transaction cards to pay the total receipt after receiving the request to pay the total receipt. In some implementations, process 400 may further include receiving a request to combine the first sub-receipt with the second sub-receipt to form a combined receipt, receiving a request to pay the combined receipt, and processing a transaction card to pay the combined receipt after receiving the request to pay the combined receipt.

In some implementations, process 400 may further include detecting a presence of a first transaction card at a first location matching the first object descriptor based on determining that the first item included in the order corresponds to the first price descriptor and the first object descriptor, and automatically processing the first transaction card to pay the first sub-receipt.

In some implementations, process 400 may further include receiving a first request to pay the first sub-receipt, storing information associated with a first transaction card presented for payment of the first sub-receipt after receiving the first request, receiving a second request to pay the second sub-receipt, storing information associated with a second transaction card presented for payment of the second sub-receipt after receiving the second request, processing the first transaction card to pay the first sub-receipt, processing the second transaction card to pay the second sub-receipt, determining that the first transaction card was declined when processing the first transaction card to pay the first sub-receipt, and processing the second transaction card to pay the first sub-receipt or a portion of the first sub-receipt based on determining that the first transaction card was declined.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
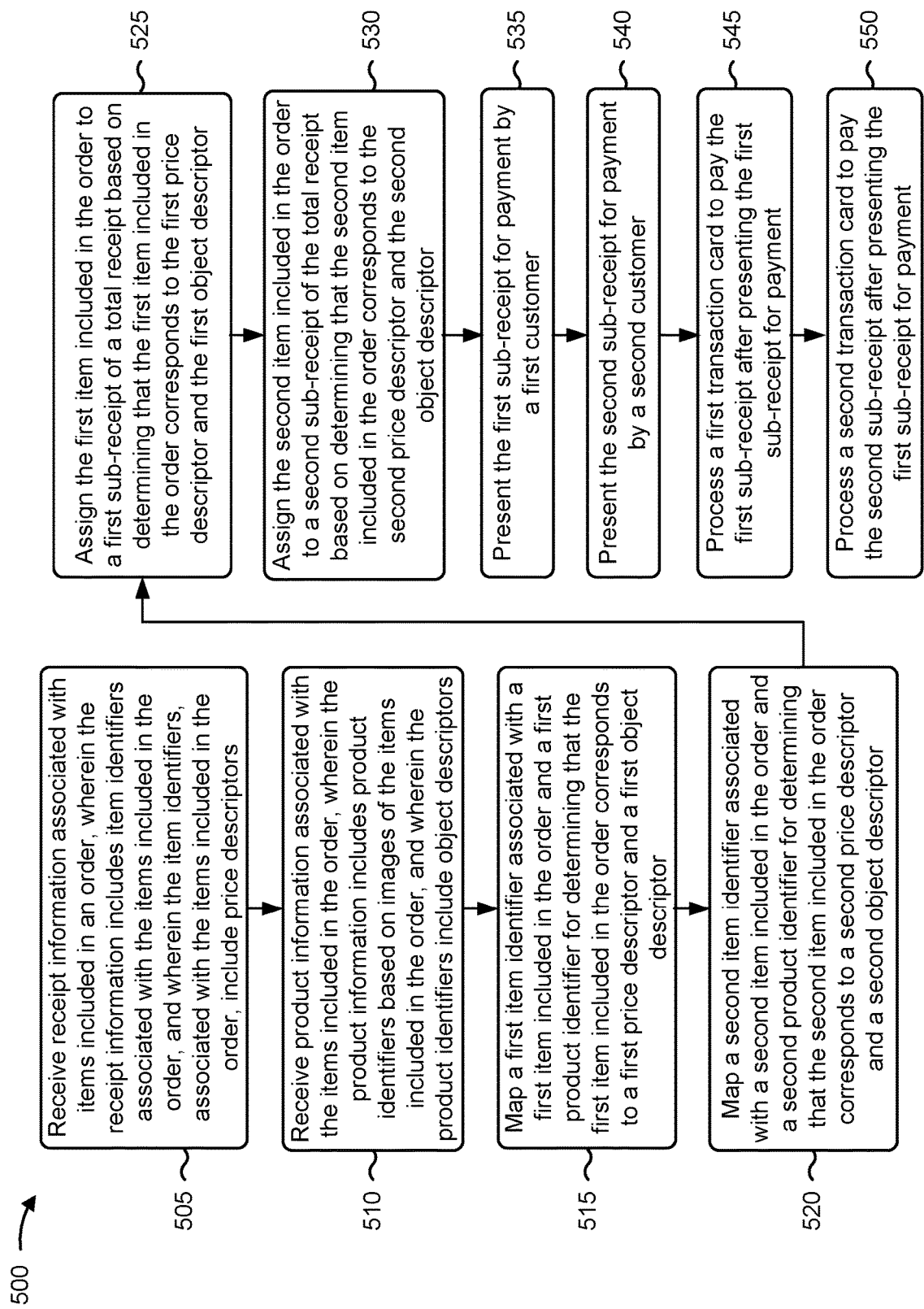
FIG. 5 is a flow chart of an example process for automated billing.

FIG. 5 is a flow chart of an example process for automated billing. In some implementations, one or more process blocks of FIG. 5 may be performed by a transaction terminal (e.g., transaction terminal 220). In some implementations, one or more process blocks of FIG. 5 may be performed by another device or a group of devices separate from or including the transaction terminal, such as an image capture device (e.g., image capture device 210), an imaging platform (e.g., imaging platform 240), or a transaction backend device (e.g., transaction backend device 260).

As shown in FIG. 5, process 500 may include receiving receipt information associated with items included in an order, wherein the receipt information includes item identifiers associated with the items included in the order, and wherein the item identifiers, associated with the items included in the order, include price descriptors (block 505). For example, the transaction terminal (e.g., transaction terminal 220, using processor 320, memory 330, storage component 340, input component 350, communication interface 370, and/or the like) may receive receipt information associated with items included in an order, as described above in connection with FIGS. 1A-1F. In some implementations, the receipt information may include item identifiers associated with the items included in the order. In some implementations, the item identifiers, associated with the items included in the order, may include price descriptors.

As further shown in FIG. 5, process 500 may include receiving product information associated with the items included in the order, wherein the product information includes product identifiers based on images of the items included in the order, and wherein the product identifiers include object descriptors (block 510). For example, the transaction terminal (e.g., transaction terminal 220, using processor 320, memory 330, storage component 340, input component 350, communication interface 370, and/or the like) may receive product information associated with the items included in the order, as described above in connection with FIGS. 1A-1F. In some implementations, the product information may include product identifiers based on images of the items included in the order. In some implementations, the product identifiers may include object descriptors.

As further shown in FIG. 5, process 500 may include mapping a first item identifier associated with a first item included in the order and a first product identifier for determining that the first item included in the order corresponds to a first price descriptor and a first object descriptor (block 515). For example, the transaction terminal (e.g., transaction terminal 220, using processor 320, memory 330, storage component 340, communication interface 370, and/or the like) may map a first item identifier associated with a first item included in the order and a first product identifier for determining that the first item included in the order corresponds to a first price descriptor and a first object descriptor, as described above in connection with FIGS. 1A-1F.

As further shown in FIG. 5, process 500 may include mapping a second item identifier associated with a second item included in the order and a second product identifier for determining that the second item included in the order corresponds to a second price descriptor and a second object descriptor (block 520). For example, the transaction terminal (e.g., transaction terminal 220, using processor 320, memory 330, storage component 340, communication interface 370, and/or the like) may map a second item identifier associated with a second item included in the order and a second product identifier for determining that the second item included in the order corresponds to a second price descriptor and a second object descriptor, as described above in connection with FIGS. 1A-1F.

As further shown in FIG. 5, process 500 may include assigning the first item included in the order to a first sub-receipt of a total receipt based on determining that the first item included in the order corresponds to the first price descriptor and the first object descriptor (block 525). For example, the transaction terminal (e.g., transaction terminal 220, using processor 320, memory 330, storage component 340, communication interface 370, and/or the like) may assign the first item included in the order to a first sub-receipt of a total receipt based on determining that the first item included in the order corresponds to the first price descriptor and the first object descriptor, as described above in connection with FIGS. 1A-1F.

As further shown in FIG. 5, process 500 may include assigning the second item included in the order to a second sub-receipt of the total receipt based on determining that the second item included in the order corresponds to the second price descriptor and the second object descriptor (block 530). For example, the transaction terminal (e.g., transaction terminal 220, using processor 320, memory 330, storage component 340, communication interface 370, and/or the like) may assign the second item included in the order to a second sub-receipt of the total receipt based on determining that the second item included in the order corresponds to the second price descriptor and the second object descriptor, as described above in connection with FIGS. 1A-1F.

As further shown in FIG. 5, process 500 may include presenting the first sub-receipt for payment by a first customer (block 535). For example, the transaction terminal (e.g., transaction terminal 220, using processor 320, memory 330, storage component 340, output component 360, communication interface 370, and/or the like) may present the first sub-receipt for payment by a first customer, as described above in connection with FIGS. 1A-1F.

As further shown in FIG. 5, process 500 may include presenting the second sub-receipt for payment by a second customer (block 540). For example, the transaction terminal (e.g., transaction terminal 220, using processor 320, memory 330, storage component 340, output component 360, communication interface 370, and/or the like) may present the second sub-receipt for payment by a second customer, as described above in connection with FIGS. 1A-1F.

As further shown in FIG. 5, process 500 may include processing a first transaction card to pay the first sub-receipt after presenting the first sub-receipt for payment (block 545). For example, the transaction terminal (e.g., transaction terminal 220, using processor 320, memory 330, storage component 340, input component 350, communication interface 370, and/or the like) may process a first transaction card to pay the first sub-receipt after presenting the first sub-receipt for payment, as described above in connection with FIGS. 1A-1F.

As further shown in FIG. 5, process 500 may include processing a second transaction card to pay the second sub-receipt after presenting the second sub-receipt for payment (block 550). For example, the transaction terminal (e.g., transaction terminal 220, using processor 320, memory 330, storage component 340, input component 350, communication interface 370, and/or the like) may process a second transaction card to pay the second sub-receipt after presenting the second sub-receipt for payment, as described above in connection with FIGS. 1A-1F.

Process 500 may include additional implementations, such as any single implementation or any combination of implementations described below and/or in connection with the one or more processes described elsewhere herein.

In some implementations, the object descriptors may include spatial descriptors that are based on one of first locations corresponding to where the items included in the order were ordered, second locations corresponding to where the items included in the order were delivered, or third locations corresponding to where the items included in the order were consumed. In some implementations, the object descriptors may be based on a location of a seat, a customer, a table, or tableware.

In some implementations, process 500 may further include receiving a request to modify the first sub-receipt. In some implementations, the request to modify the first sub-receipt may include adding a third item included in the order to the first sub-receipt.

In some implementations, process 500 may further include receiving a request to modify the first sub-receipt and the second sub-receipt prior to processing the first transaction card to pay the first sub-receipt and prior to processing the second transaction card to pay the second sub-receipt. In some implementations, the request to modify the first sub-receipt and the second sub-receipt may identify an item to be split between the first sub-receipt and the second sub-receipt. In some implementations, process 500 may further include assigning the item to be split between the first sub-receipt and the second sub-receipt to the first sub-receipt, to form a modified first sub-receipt, and to the second sub-receipt, to form a modified second sub-receipt, based on the request to modify the first sub-receipt and the second sub-receipt. Additionally, process 500 may include presenting the modified first sub-receipt for payment by the first customer, presenting the modified second sub-receipt for payment by the second customer, processing the first transaction card to pay the modified first sub-receipt after presenting the modified first sub-receipt for payment, and processing the second transaction card to pay the modified second sub-receipt after presenting the modified second sub-receipt for payment.

In some implementations, process 500 may further include detecting a presence of the first transaction card at a first location matching the first object descriptor based on determining that the first item included in the order corresponds to the first price descriptor and the first object descriptor, and automatically processing the first transaction card to pay the first sub-receipt.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
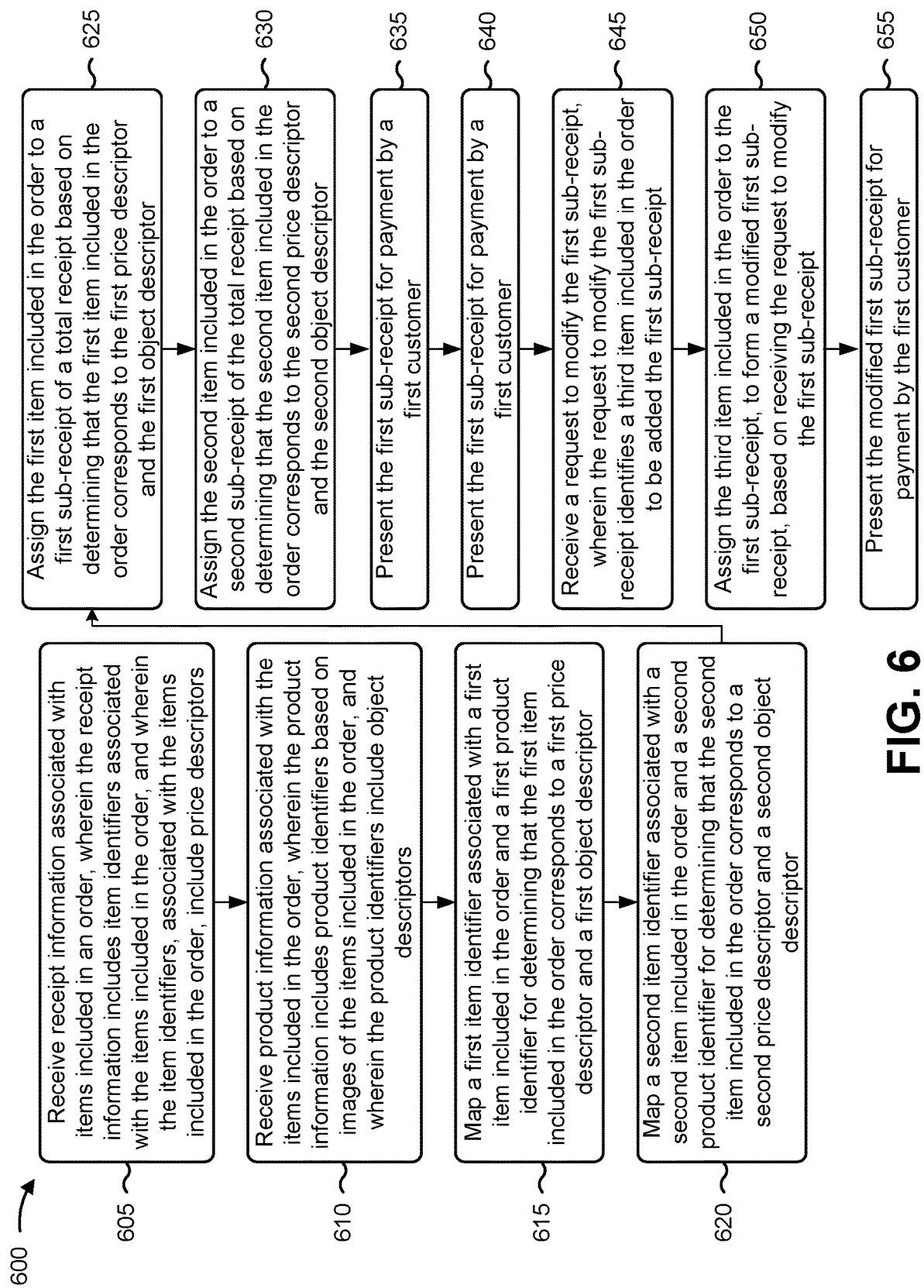
FIG. 6 is a flow chart of an example process for automated billing.

FIG. 6 is a flow chart of an example process for automated billing. In some implementations, one or more process blocks of FIG. 6 may be performed by a transaction terminal (e.g., transaction terminal 220). In some implementations, one or more process blocks of FIG. 6 may be performed by another device or a group of devices separate from or including the transaction terminal, such as an image capture device (e.g., image capture device 210), an imaging platform (e.g., imaging platform 240), or a transaction backend device (e.g., transaction backend device 260).

As shown in FIG. 6, process 600 may include receiving receipt information associated with items included in an order, wherein the receipt information includes item identifiers associated with the items included in the order, and wherein the item identifiers, associated with the items included in the order, include price descriptors (block 605). For example, the transaction terminal (e.g., transaction terminal 220, using processor 320, memory 330, storage component 340, input component 350, communication interface 370, and/or the like) may receive receipt information associated with items included in an order, as described above in connection with FIGS. 1A-1F. In some implementations, the receipt information may include item identifiers associated with the items included in the order. In some implementations, the item identifiers, associated with the items included in the order, may include price descriptors.

As further shown in FIG. 6, process 600 may include receiving product information associated with the items included in the order, wherein the product information includes product identifiers based on images of the items included in the order, and wherein the product identifiers, based on the images of the items included in the order, include object descriptors (block 610). For example, the transaction terminal (e.g., transaction terminal 220, using processor 320, memory 330, storage component 340, input component 350, communication interface 370, and/or the like) may receive product information associated with the items included in the order, as described above in connection with FIGS. 1A-1F. In some implementations, the product information may include product identifiers based on images of the items included in the order. In some implementations, the product identifiers, based on the images of the items included in the order, may include object descriptors.

As further shown in FIG. 6, process 600 may include mapping a first item identifier associated with a first item included in the order and a first product identifier for determining that the first item included in the order corresponds to a first price descriptor and a first object descriptor (block 615). For example, the transaction terminal (e.g., transaction terminal 220, using processor 320, memory 330, storage component 340, communication interface 370, and/or the like) may map a first item identifier associated with a first item included in the order and a first product identifier for determining that the first item included in the order corresponds to a first price descriptor and a first object descriptor, as described above in connection with FIGS. 1A-1F.

As further shown in FIG. 6, process 600 may include mapping a second item identifier associated with a second item included in the order and a second product identifier for determining that the second item included in the order corresponds to a second price descriptor and a second object descriptor (block 620). For example, the transaction terminal (e.g., transaction terminal 220, using processor 320, memory 330, storage component 340, communication interface 370, and/or the like) may map a second item identifier associated with a second item included in the order and a second product identifier for determining that the second item included in the order corresponds to a second price descriptor and a second object descriptor, as described above in connection with FIGS. 1A-1F.

As further shown in FIG. 6, process 600 may include assigning the first item included in the order to a first sub-receipt based on determining that the first item included in the order corresponds to the first price descriptor and the first object descriptor (block 625). For example, the transaction terminal (e.g., transaction terminal 220, using processor 320, memory 330, storage component 340, communication interface 370, and/or the like) may assign the first item included in the order to a first sub-receipt based on determining that the first item included in the order corresponds to the first price descriptor and the first object descriptor, as described above in connection with FIGS. 1A-1F.

As further shown in FIG. 6, process 600 may include assigning the second item included in the order to a second sub-receipt based on determining that the second item included in the order corresponds to the second price descriptor and the second object descriptor (block 630). For example, the transaction terminal (e.g., transaction terminal 220, using processor 320, memory 330, storage component 340, communication interface 370, and/or the like) may assign the second item included in the order to a second sub-receipt based on determining that the second item included in the order corresponds to the second price descriptor and the second object descriptor, as described above in connection with FIGS. 1A-1F.

As further shown in FIG. 6, process 600 may include presenting the first sub-receipt for payment by a first customer (block 635). For example, the transaction terminal (e.g., transaction terminal 220, using processor 320, memory 330, storage component 340, output component 360, communication interface 370, and/or the like) may present the first sub-receipt for payment by a first customer, as described above in connection with FIGS. 1A-1F.

As further shown in FIG. 6, process 600 may include presenting the second sub-receipt for payment by a second customer (block 640). For example, the transaction terminal (e.g., transaction terminal 220, using processor 320, memory 330, storage component 340, output component 360, communication interface 370, and/or the like) may present the second sub-receipt for payment by a second customer, as described above in connection with FIGS. 1A-1F.

As further shown in FIG. 6, process 600 may include receiving a request to modify the first sub-receipt, wherein the request to modify the first sub-receipt identifies a third item included in the order to be added the first sub-receipt (block 645). For example, the transaction terminal (e.g., transaction terminal 220, using processor 320, memory 330, storage component 340, input component 350, communication interface 370, and/or the like) may receive a request to modify the first sub-receipt, as described above in connection with FIGS. 1A-1F. In some implementations, the request to modify the first sub-receipt identifies a third item included in the order to be added the first sub-receipt.

As further shown in FIG. 6, process 600 may include assigning the third item included in the order to the first sub-receipt, to form a modified first sub-receipt, based on receiving the request to modify the first sub-receipt (block 650). For example, the transaction terminal (e.g., transaction terminal 220, using processor 320, memory 330, storage component 340, communication interface 370, and/or the like) may assign the third item included in the order to the first sub-receipt, to form a modified first sub-receipt, based on receiving the request to modify the first sub-receipt, as described above in connection with FIGS. 1A-1F.

As further shown in FIG. 6, process 600 may include presenting the modified first sub-receipt for payment by the first customer (block 655). For example, the transaction terminal (e.g., transaction terminal 220, using processor 320, memory 330, storage component 340, output component 360, communication interface 370, and/or the like) may present the modified first sub-receipt for payment by the first customer, as described above in connection with FIGS. 1A-1F.

Process 600 may include additional implementations, such as any single implementation or any combination of implementations described below and/or in connection with the one or more processes described elsewhere herein.

In some implementations, process 600 may further include receiving a request to combine the first sub-receipt with the second sub-receipt to form a total receipt, receiving a request to pay the total receipt, and processing a plurality of transaction cards to pay the total receipt. In some implementations, process 600 may further include receiving a request to combine the first sub-receipt with the second sub-receipt to form a combined receipt, receiving a request to pay the combined receipt, and processing a first transaction card to pay the combined receipt.

In some implementations, process 600 may further include detecting a presence of a first transaction card at a first location matching the first object descriptor based on determining that the first item included in the order corresponds to the first price descriptor and the first object descriptor, and automatically processing the first transaction card to pay the first sub-receipt.

In some implementations, process 600 may further include mapping a fourth item identifier associated with a fourth item included in the order and a fourth product identifier for determining that the fourth item included in the order corresponds to a fourth price descriptor and a fourth object descriptor, assigning the fourth item included in the order to a third sub-receipt based on determining that the fourth item included in the order corresponds to the fourth price descriptor and the fourth object descriptor, and presenting the third sub-receipt for payment by a third customer.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein provide a transaction terminal 220 that is capable of receiving, processing, analyzing, and/or correlating receipt information and product information to automatically generate and/or present multiple sub-receipts based on one receipt for an order by multiple customers. The transaction terminal 220 may further automate payment processing for the multiple sub-receipts for the order by multiple customers. In this way, the transaction terminal 220 obviates the need for manually splitting the one receipt into multiple receipts and/or manually processing multiple payments for the one receipt by a merchant employee.

In this way, the transaction terminal 220 improves the efficiency at which payment transactions are processed and/or completed by virtue of automated receipt splitting, payment presentation, and/or payment processing. For example, the transaction terminal 220 described herein obviates the need to manually split a receipt into multiple sub-receipts, thereby reducing errors associated with billing for payment transactions. Furthermore, providing the transaction terminal 220 with a user interface facilitates automated sub-receipt presentation while enabling modification of the sub-receipts, and enables payments to be completed without intervention by a merchant employee. Additionally, providing the transaction terminal 220 with the user interface enables customers to customize the itemization of sub-receipts and/or the payment of the sub-receipts without the need for intervention by the merchant employee. Furthermore, providing the transaction terminal 220 with the user interface obviates the need for customers having to download or utilize extraneous payment applications for completing payment transactions, thereby conserving computing resources, and reducing network traffic.

Additionally, the transaction terminal 220 can further automate the procedures and/or processes for responding to one or more declined payments for an order that includes multiple payments. For example, the transaction terminal 220 may execute a set of predetermined rules or instructions that instruct the transaction terminal to process the transaction cards approved for the order including multiple payments to settle the declined payment. Additionally, or alternatively, the transaction terminal 220 may receive customer input via the user interface to receive instructions from one or more customers associated with the order including multiple payments on how to respond to the declined payment.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. In addition, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. In addition, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising: receiving, by a first device and from a second device, one or more captured images, first location data, and second location data, the one or more captured images being associated with one or more first items and one or more second items, the first location data including first object descriptors indicating: a spatial location of a first customer associated with the one or more first items, and a location of the one or more first items, the first object descriptors being based on the one or more captured images, and the second location data including second object descriptors: indicating a spatial location of a second customer associated with the one or more second items, and a location of the one or more second items, the second object descriptors being based on the one or more captured images; generating, by the first device, based on training an imaging model to match incoming image data to product identifiers, and based on the one or more captured images, the first location data, and the second location data, product information; and sending, by the first device and to a transaction terminal, the product information.

2. The method of claim 1, wherein the product information is generated based on the one or more captured images being analyzed using an object recognition or image indexing technique.

3. The method of claim 1, wherein the product information is generated based on metadata associated with the one or more captured images being passed through the imaging model.

4. The method of claim 1, wherein the incoming image data is obtained from one or more other images captured by the second device.

5. The method of claim 1, wherein generating the product information comprises:
generating a plurality of product identifiers based on an image of the one or more captured images.

6. The method of claim 5, wherein the plurality of product identifiers include information identifying one or more degrees of confidence.

7. The method of claim 1, wherein the product information includes: one or more other product identifiers based on the one or more captured images; and one or more object descriptors based on at least one of the first location data or the second location data.

8. A first device, comprising: one or more memories; and one or more processors, coupled to the one or more memories, configured to: receive, from a second device, one or more captured images, first location data, and second location data, the one or more images being associated with one or more first items and one or more second items, the first location data including first object descriptors indicating: a spatial location of a first customer associated with the one or more first items, and a location of the one or more first items, the first object descriptors being based on the one or more captured images, and the second location data including second object descriptors indicating: a spatial location of a second customer associated with the one or more second items, and a location of the one or more second items, the second object descriptors being based on the one or more captured images;

generate, based on an imaging model being trained to match incoming image data with product identifiers and based on the one or more captured images, the first location data, and the second location data, product information; and send, to a third device, the product information.

9. The first device of claim 8, wherein the product information is generated based on using an object recognition or image indexing technique.

10. The first device of claim 8, wherein the product information is generated based on metadata associated with the one or more images being passed through the imaging model.

11. The first device of claim 8, wherein the incoming image data is based on one or more other images captured by the second device.

12. The first device of claim 8, wherein the one or more processors, to generate the product information, are configured to:

generate a plurality of product identifiers based on an image of the one or more images.

13. The first device of claim 12, wherein the plurality of product identifiers are associated with varying degrees of confidence.

14. The first device of claim 8, wherein the product information includes: one or more other product identifiers based on the one or more captured images; and one or more object descriptors based on at least one of the first location data or the second location data.

15. A non-transitory computer-readable medium storing a set of instructions, the set of instructions comprising: one or more instructions that, when executed by one or more processors of a first device, cause the first device to: receive, from a second device, one or more captured images, first location data, and second location data, the one or more images being associated with one or more first items and one or more second items, the first location data including first object descriptors indicating: a spatial location of a first customer associated with the one or more first items, and a location of the one or more first items, the first object descriptors being based on the one or more captured images, and the second location data including second object descriptors indicating: a spatial location of a second customer associated with the one or more second items, and a location of the one or more second items, the second object descriptors being based on the one or more captured images;

generate, based on an imaging model being trained to match incoming image data and product identifiers and based on the one or more captured images, the first location data, and the second location data, product information; and output the product information.

16. The non-transitory computer-readable medium of claim 15, wherein the product information is generated based on an object recognition or image indexing technique.

17. The non-transitory computer-readable medium of claim 15, wherein the product information is generated based on metadata associated with the one or more captured images being passed through the imaging model.

18. The non-transitory computer-readable medium of claim 15, wherein the incoming image data is based on one or more other images captured by the second device.

19. The non-transitory computer-readable medium of claim 15, wherein the one or more instructions, that cause the first device to generate the product information, cause the first device to:

generate a plurality of product identifiers for an image of the one or more captured images.

20. The non-transitory computer-readable medium of claim 19, wherein the plurality of product identifiers include information identifying one or more degrees of confidence.

\* \* \* \* \*